US012489821B2

United States Patent
Kim et al.

(10) Patent No.: US 12,489,821 B2
(45) Date of Patent: Dec. 2, 2025

(54) DISTRIBUTED CLOUD SYSTEM, AND DATA PROCESSING METHOD AND STORAGE MEDIUM OF DISTRIBUTED CLOUD SYSTEM

(71) Applicant: ELECTRONICS AND TELECOMMUNICATIONS RESEARCH INSTITUTE, Daejeon (KR)

(72) Inventors: Dae-Won Kim, Daejeon (KR); Su-Min Jang, Sejong-si (KR); Sun-Wook Kim, Hwaseong-si (KR); Jae-Geun Cha, Daejeon (KR); Hyun-Hwa Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/589,008

(22) Filed: Feb. 27, 2024

(65) Prior Publication Data

US 2024/0291895 A1   Aug. 29, 2024

(30) Foreign Application Priority Data

Feb. 28, 2023   (KR) .................... 10-2023-0026438
Mar. 10, 2023   (KR) .................... 10-2023-0031625
Sep. 5, 2023   (KR) .................... 10-2023-0117581

(51) Int. Cl.
*H04L 67/289*   (2022.01)
*H04L 41/0668*   (2022.01)
*H04L 67/59*   (2022.01)

(52) U.S. Cl.
CPC ........ *H04L 67/289* (2013.01); *H04L 41/0668* (2013.01); *H04L 67/59* (2022.05)

(58) Field of Classification Search
None
See application file for complete search history.

(56) References Cited

U.S. PATENT DOCUMENTS

| 10,298,670 B2 | 5/2019 | Ben-Shaul et al. |
| 10,761,952 B2 | 9/2020 | Selvaraj et al. |

(Continued)

FOREIGN PATENT DOCUMENTS

| JP | 2021-78098 A | 5/2021 |
| KR | 10-2245340 B1 | 4/2021 |

(Continued)

OTHER PUBLICATIONS

Lanlan Rui et al., "Service migration in multi-access edge computing: A joint state adaptation and reinforcement learning mechanism", Journal of Network and Computer Applications, Apr. 5, 2021, 21 pages.

(Continued)

*Primary Examiner* — Mohamed Ibrahim
(74) *Attorney, Agent, or Firm* — Sughrue Mion, PLLC

(57) ABSTRACT

Disclosed herein are a distributed cloud system and a data-processing method and storage medium of the distributed cloud system. The data-processing method of the distributed cloud system includes executing an application of an edge computer system, requested by a user device, creating a snapshot image of the application, and storing the created image and transferring the stored image when migration is performed.

13 Claims, 23 Drawing Sheets

(56) References Cited

U.S. PATENT DOCUMENTS

| | | |
|---|---|---|
| 10,771,569 B1 | 9/2020 | Wang |
| 11,036,536 B2 | 6/2021 | Wang |
| 11,252,159 B2 | 2/2022 | Kannan et al. |
| 2020/0084202 A1 | 3/2020 | Smith et al. |
| 2020/0366732 A1* | 11/2020 | Trang .................... H04W 48/20 |
| 2022/0164186 A1 | 5/2022 | Pamidala et al. |
| 2022/0222134 A1* | 7/2022 | Lai ......................... G06V 20/46 |
| 2022/0366459 A1* | 11/2022 | Vieyra ................ H04L 65/4038 |
| 2023/0342496 A1* | 10/2023 | Doshi .................. G06F 21/6281 |
| 2023/0367648 A1* | 11/2023 | Xing ..................... G06F 9/5044 |

FOREIGN PATENT DOCUMENTS

| | | |
|---|---|---|
| KR | 10-2022-0062836 A | 5/2022 |
| KR | 10-2486602 B1 | 1/2023 |
| KR | 10-2023-0024416 A | 2/2023 |

OTHER PUBLICATIONS

Shiqiang Wang et al., "Dynamic Service Migration in Mobile Edge Computing Based on Markov Decision Process", IEEE/ACM Transactions on Networking, May 31, 2019.
Tarik Taleb et al., "On Multi-Access Edge Computing: A Survey of the Emerging 5G Network Edge Cloud Architecture and Orchestration", IEEE Communications Surveys & Tutorials, May 18, 2017.

\* cited by examiner

DISTRIBUTED CLOUD SYSTEM, AND DATA PROCESSING METHOD AND STORAGE MEDIUM OF DISTRIBUTED CLOUD SYSTEM

CROSS REFERENCE TO RELATED APPLICATIONS

This application claims the benefit of Korean Patent Applications No. 10-2023-0026438, filed Feb. 28, 2023, No. 10-2023-0031625, filed Mar. 10, 2023, and No. 10-2023-0117581, filed Sep. 5, 2023, which are hereby incorporated by reference in their entireties into this application.

BACKGROUND OF THE INVENTION

1. Technical Field

The present disclosure relates generally to distributed cloud technology, and more particularly to technology for data processing and service migration for edge computing in a distributed cloud environment.

2. Description of the Related Art

A migration function for service transfer in a distributed cloud is provided in order to maintain a seamless service in a cloud environment in which services are redeployed in real time. Migration is performed between edge clouds or between an edge cloud and another cloud in consideration of resource shortages, failures, and cost efficiency.

A proximity service of an edge cloud needs a seamless service in order to support a mobile service. Therefore, a function to migrate a container-based or virtual-machine-based application is proposed as a key function of service transfer management and as a solution to overcome failures in the distributed cloud.

Currently, in order to overcome processing and transmission delays, which are caused whereby exploding data generated by a large number of terminals in response to users' demand is concentrated in a central cloud, technology for providing an intelligent cloud edge service, which processes data at a location near terminals, is being developed, and service systems related thereto are also being released. Among them, Kubernetes operating as a single cluster is a tool designed for orchestration and integrated operation of a container environment based on the Open Container Initiative (OCI), and is most widely used these days.

In order to provide a service by connecting distributed cloud edges with a core cloud, various methods are being researched. To this end, Istio of the open source community, which is service mesh technology based on layer 7 (L7), is actively underway. A service mesh is a program developed for connection between microservices. Because this method enables a control plane to be shared on multiple networks and enables clusters to communicate with each other through a gateway, there is no need to directly connect two networks. Also, development of software having a function of connecting multiple networks using IPsec tunneling of layer 3 (L3 network level) is also actively underway.

In order to overcome processing and transmission delays caused by concentration of massive data generated by a large number of edge terminals in a cloud, edge computing requires a part to process data at a location near the terminals and to perform distributed cooperation between the cloud, the edge, and the terminals.

Distributed cooperation does not depend on simple deployment through a cluster but requires real-time transfer of data and application software in order to satisfy the requirements for edge computing, such as low latency, processing near terminals, and the like, and this is more necessary for services for mobile objects (autonomous driving).

However, the existing edge systems lack a management method in which multiple clusters are taken into account.

Also, the existing edge systems provide services that are not optimized for bare-metal, a container, Function-as-a-Service (FaaS), or the like.

Also, the existing edge systems do not provide a method for adding resources for guaranteeing performance when there is a lack of available resources.

Also, the existing edge systems require design at an application level for vertical/horizontal cooperation.

Also, the existing edge systems lack a network structure for connecting multiple clusters at high speeds.

Also, the existing edge systems have a performance problem with the OCI used in Kubernetes (delay of a service sensitive to response speed).

Also, the existing edge systems have no architectural technology for a perfect cooperation solution.

Meanwhile, Korean Patent Application Publication No. 10-2023-0024416, titled "Method and apparatus for migration of virtual machine across cloud platform, and storage medium and electronic apparatus", discloses an apparatus and method for migration to a disk storage library of a target virtual machine of a target cloud platform.

SUMMARY OF THE INVENTION

An object of the present disclosure is to provide service migration for efficient cooperation between clusters.

Another object of the present disclosure is to provide a high-speed network connection between multiple clusters for a cooperation service.

A further object of the present disclosure is to provide optimal management for cooperation between clusters on a connected network.

In order to accomplish the above objects, a data-processing method of a distributed cloud system according to an embodiment of the present disclosure includes executing an application of an edge computer system, requested by an external device, periodically checking, by a high availability proxy, a network connection with the edge computer system, and restoring a seamless network connection by performing failover through a new connection with an additional edge computer system using service exposure when the network connection with the edge computer system is disconnected.

Here, the application may maintain a seamless service connection with the external device.

Here, executing the application may comprise storing the current state of the application as a snapshot image.

Here, restoring the seamless network connection may comprise migrating the snapshot image to shared storage.

Here, restoring the seamless network connection may comprise restoring the snapshot image when the snapshot image is migrated.

Here, the high availability proxy may record at least one of a service port thereof, or an address thereof, or a combination of the service port and the address in the additional edge computer system for the restored network connection.

Here, when the network connection with the edge computer system is disconnected, the high availability proxy may automatically access the additional edge computer system, which is announced in advance.

Also, in order to accomplish the above objects, a distributed cloud system according to an embodiment of the present disclosure includes storage, a processor, and a network system connected with a computer system. The processor executes an application of an edge computer system, which is requested by an external device, makes a high availability proxy periodically check a network connection with the edge computer system, and restores a seamless network connection by performing failover through a new connection with an additional edge computer system using service exposure when the network connection with the edge computer system is disconnected.

Here, the application may maintain a seamless service connection with the external device.

Here, the processor may store the current state of the application as a snapshot image.

Here, the processor may migrate the snapshot image to shared storage.

Here, when the snapshot image is migrated, the processor may restore the snapshot image.

Here, the high availability proxy may record at least one of a service port thereof, or an address thereof, or a combination of the service port and the address in the additional edge computer system for the restored network connection.

Here, when the network connection with the edge computer system is disconnected, the high availability proxy may automatically access the additional edge computer system, which is announced in advance.

Also, in order to accomplish the above objects, a storage medium of a distributed cloud system according to an embodiment of the present disclosure executes an application of an edge computer system, which is requested by a user device, makes a high availability proxy periodically check a network connection with the edge computer system, and restores a seamless network connection by performing failover through a new connection with an additional edge computer system using service exposure when the network connection with the edge computer system is disconnected.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
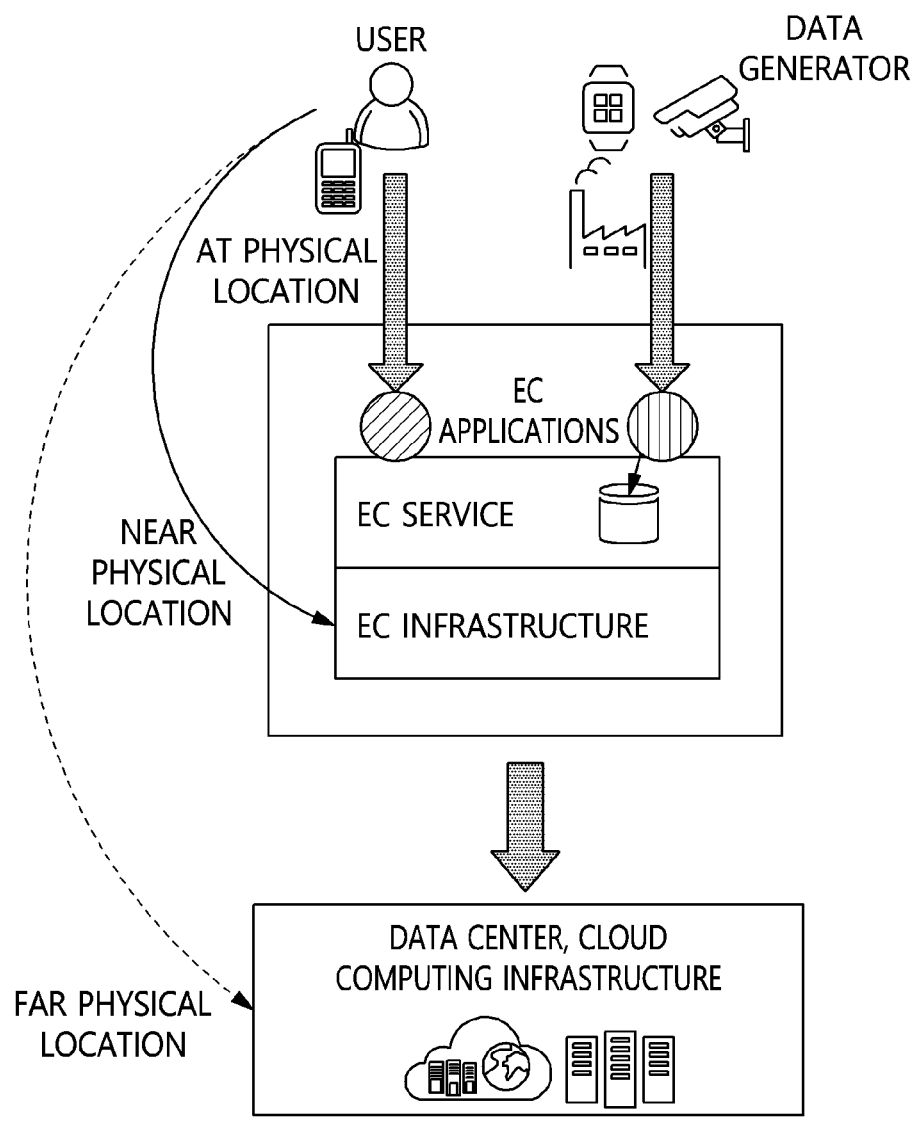
FIG. 1 is a view illustrating an edge computing concept according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

FIG. 1 is a view illustrating an edge computing concept according to an embodiment of the present disclosure.

Referring to FIG. 1, edge computing included in a distributed cloud system according to an embodiment of the present disclosure is defined as computing technology enabling data to be processed at or near a physical location at which the data is created and consumed. In this definition, the edge corresponds to the physical location at which data is created or consumed.

An edge computing application is end-to-end business logic provided to a user. The edge computing application may be implemented using an edge computing service and executed in an edge computing infrastructure.

The edge computing service is a service having one or more edge computing capabilities for providing edge computing applications using an edge computing infrastructure. The edge computing service may be provided in any of various forms.

The edge computing infrastructure is an infrastructure at or near a physical location at which an edge computing application is executed and at which data is stored. The edge computing infrastructure may have various types depending on resources and the configuration of the resources.

The resource types of the edge computing infrastructure may include physical or software resources for supporting computing, storage, networks, and the like.

The physical resources may include servers, personal computers, embedded system devices or mobile devices, physical data centers, and the like.

The software resources may include software programs, operating systems (OS), virtual resources such as containers, virtual resources provided in a virtual machine or by a Cloud Service Provider (CSP), and the like.

The edge computing infrastructure may include resources connected with a series of physical and software resources provided in the services and infrastructures of other technologies (e.g., cloud computing, Internet-of-Things (IoT), Big data, and the like).

Various applications emerging with the development of IT technology brought on new system requirements, and edge computing for better service quality and performance has many advantages in meeting the requirements of the various applications.

Various applications using edge computing may include smart factories, games, autonomous vehicles, transportation, smart cities, smart retail, smart robots, smart homes, healthcare, smart farming, smart grids, smart buildings, and the like.

Edge computing may minimize a network delay caused due to remote access and transfer of large amounts of data in a centralized processing environment.

Edge computing may perform high-speed transfer and storage of large amounts of data generated by an increasing number of IoT devices.

Edge computing may perform real-time access to and processing of data having different features and different geographical locations.

Edge computing may provide effective services suitable for ultrahigh-speed mobile communication technologies, such as 5G and the like.

The concept of edge computing may be viewed from a user perspective and a technological perspective.

When edge computing is viewed from the user perspective, edge computing users may be categorized into all users, applications, and systems that create and consume data using edge computing services and edge computing applications. The edge computing users may use a high-speed network in order to access edge computing applications at the shortest network distance.

The network distance means the shortest path between two points connected over a network. Also, edge computing may measure the shortest path even in a single edge computing infrastructure. The edge computing infrastructure may include resources in a connected form.

From the user perspective, edge computing may include using an application that is closest to a user in order to minimize a service delay.

From the user perspective, edge computing may include using an application that is closest to a user in order to store data generated in a data generator.

From the user perspective, edge computing may include using an application that is closest to data in order to prevent data transfer for data processing and to minimize the frequency of data transfer.

When edge computing is viewed from the technological perspective, an edge computing application may be executed in an edge computing infrastructure at the shortest network distance from a user. Edge computing may provide a network connection to other Information and Communication Technology (ICT) infrastructures, such as a cloud computing infrastructure and a data center, in order to deploy edge computing applications to be closer to a user.

The edge computing application may include a single piece of software or a software set.

Edge computing may physically support edge computing applications at a remote location using connectivity between the edge computing infrastructure and other ICT infrastructures. Also, the edge computing infrastructure may solve resource constraints and distribute excessive workloads by cooperating with infrastructures connected therewith. Edge computing may minimize data transfer by distributing an edge computing application that uses adjacent data for cooperation.

Examples of the excessive workloads may include machine-learning education, real-time image processing for virtual reality (VR) and augmented reality (AR), and real-time storage and analysis of Big data.

Cooperation for edge computing means operating multiple edge computing (EC) infrastructures together with other ICT infrastructures in order to provide edge computing applications meeting the system requirements.

Cooperation for edge computing may comprise offloading an edge computing application to a larger scale environment and migrating an edge computing application between the EC infrastructure and other ICT infrastructures for user proximity.

Edge computing may provide orchestration for distribution, connection, adjustment, and cooperation according to a rule or policy optimized for various applications.

Orchestration for edge computing means a process for providing automated distribution, execution, control, and adjustment of an edge computing application using an EC service depending on the criteria for optimization.

From the technological perspective, edge computing may include connectivity for an edge computing infrastructure, cooperation with cloud computing and a large-scale data center, and orchestration for the best utilization and availability according to a rule or policy for optimization.

Figure 2:
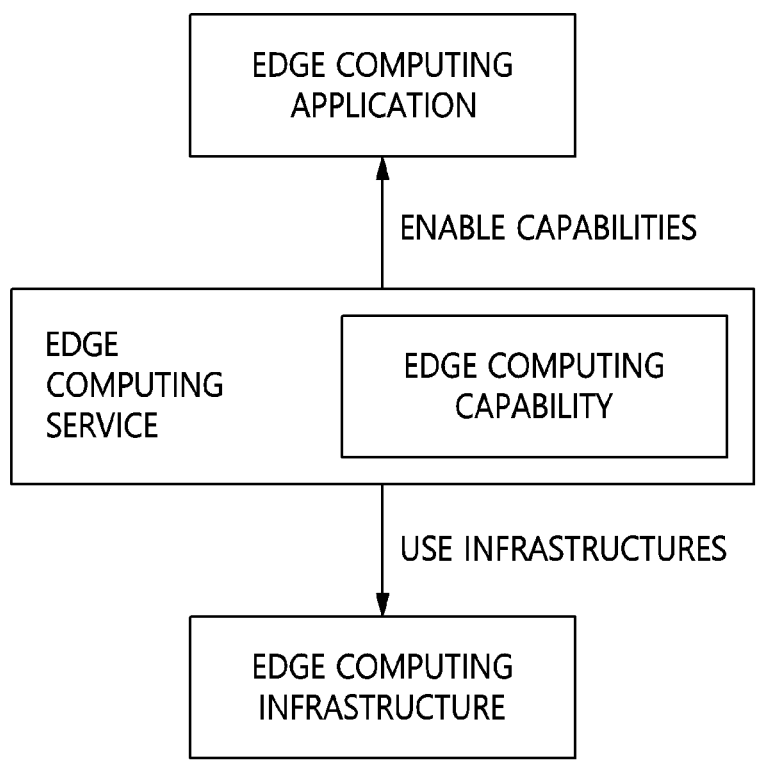
FIG. 2 is a view illustrating the concept of an edge computing service according to an embodiment of the present disclosure.

FIG. 2 is a view illustrating the concept of an edge computing service according to an embodiment of the present disclosure.

Referring to FIG. 2, edge computing is being developed together with various applications of industries. Common characteristics may be derived from the various applications of the industries and the concept of edge computing.

The common characteristics of edge computing may include low latency, network connectivity, user proximity for data processing, data affinity, support of mobility, availability of an infrastructure, utilization of an infrastructure, cooperation between infrastructures, and intellectualization.

The low latency of edge computing is closely related to the response time that a user experiences when using an application. Latency may arise from a network delay, a processing delay, an input/output (I/O) bottleneck phenomenon, tail latency, and an infrastructure error.

The tail latency is a delay caused at a specific location when an edge computing application is connected and associated with different infrastructures.

For the network connectivity, an edge computing infrastructure may be connected with various infrastructures through an edge computing service. The edge computing infrastructure capable of being connected to a network may be used to deploy an edge computing application near a user for low latency.

Also, the edge computing infrastructure may be used for cooperation for an edge computing application.

Accordingly, edge computing may provide a faster network and a faster path to the edge computing application.

Also, edge computing may provide smooth network connectivity between a user and an edge computing application using high availability.

A network connection may include a secure tunneling-based network using IPsec.

Also, the network connection may include a routing rule based on a network proxy using the application layer of the TCP protocol.

The routing rule based on the network proxy may correspond to basic routing for a gateway between network layers and internal recognition of the edge computing infrastructure.

The user proximity for data processing means data processing by which data is created and consumed by the definition of edge computing. Edge computing may store data to be close to a user or process data while minimizing the transfer of the data in order to provide user proximity of data processing.

The data affinity means the degree of proximity of data to an edge computing application. Edge computing may use an edge computing infrastructure in which data resides. Edge computing may share and synchronize data for data preference using a connected infrastructure.

The support of mobility may enable edge computing applications having mobility (e.g., autonomous drones, autonomous vehicles, and the like) to be provided using various technologies for determining the behavior and role of vehicles by analyzing collected data. Edge computing may provide a smooth network connection and faster decision-making in an edge computing infrastructure.

Edge computing may provide availability of an edge computing infrastructure, which can use an adjacent infrastructure for user proximity for data processing. Accordingly, edge computing may provide an interface through which an infrastructure can be accessed depending on the type and configuration of resources.

Considering resource constraints, edge computing may use an infrastructure when processing data or providing a service. Accordingly, edge computing may utilize a large-scale data center or a cloud computing infrastructure for high performance and overcome the resource constraints through resource expansion and cooperation.

Edge computing may solve the resource constraints through cooperation between connected infrastructures, offload an edge computing application to a large-scale infrastructure, and redistribute workloads through migration for user proximity.

A migration process may include migrating an edge computing application and relevant data.

Application migration may include control processes, including checking the state of an edge computing application, checking a target by an edge computing infrastructure, storing the current state of the edge computing application as a snapshot image, restoring the image, and the like.

Migration uses shared or federated storage having a high-speed network (e.g., a kernel-bypass network), thereby storing and restoring a snapshot of the running state of the edge computing application in real time.

Offloading may include a function of transferring the role of processing resource-intensive computation to a hardware accelerator or a data center having a larger-scale computing resource.

With regard to intellectualization, applications using Artificial Intelligence (AI) have become main applications of edge computing due to the recent development of AI technology. Edge computing may use AI technology for advanced features for edge computing and provide edge computing applications using various AI technologies along with edge computing capabilities.

In the edge computing concept, an edge computing service may be defined as providing one or more capabilities through an edge computing infrastructure. Edge computing may provide edge computing capabilities satisfying common characteristics in order to provide the edge computing service.

As illustrated in FIG. 2, the edge computing service may provide the edge computing capabilities using an edge computing infrastructure.

Also, the edge computing service may provide a user with an edge computing application satisfying the common characteristics.

Also, the edge computing service may provide various forms of services through the edge computing infrastructure.

The edge computing service may provide not only a computing environment in which an edge computing application is executed but also various interfaces for providing storage and a network environment.

The various forms of services provided by the edge computing infrastructure may include a monolithic service, a cloud service (e.g., Platform-as-a-Service (PaaS)), a microservice including a container, a service in the form of event-based platform (e.g., a serverless form and Function-as-a-Service (FaaS)), and the like.

The edge computing service may provide edge computing capabilities to users by being provided as a single service or being combined with each service.

The edge computing capabilities are capabilities that are provided in order for an edge computing service to impart common characteristics to edge computing applications. The edge computing capabilities may be provided in any of various manners depending on the characteristics required by an edge computing application and the type of an edge computing infrastructure.

The edge computing capabilities based on the common characteristics may include low latency, network connection, data preference, cooperation, and automated orchestration capabilities.

The low-latency capability may impart a low latency characteristic to an edge computing application.

The network connection capability may connect an edge computing infrastructure with other infrastructures, maintain the smooth connection between the edge computing infrastructure and other infrastructures, and access an edge computing service and an edge computing application.

The data preference capability may store and process data in or near an edge computing application.

The cooperation capability may maximize the efficiency of a connected infrastructure by offloading, migrating, and replicating an edge computing application.

The automated orchestration capability may provide automated distribution, execution, control, scheduling, and adjustment of an edge computing application according to criteria for optimization in order to achieve availability, interoperability, usefulness, intelligence, and the like.

Figure 3:
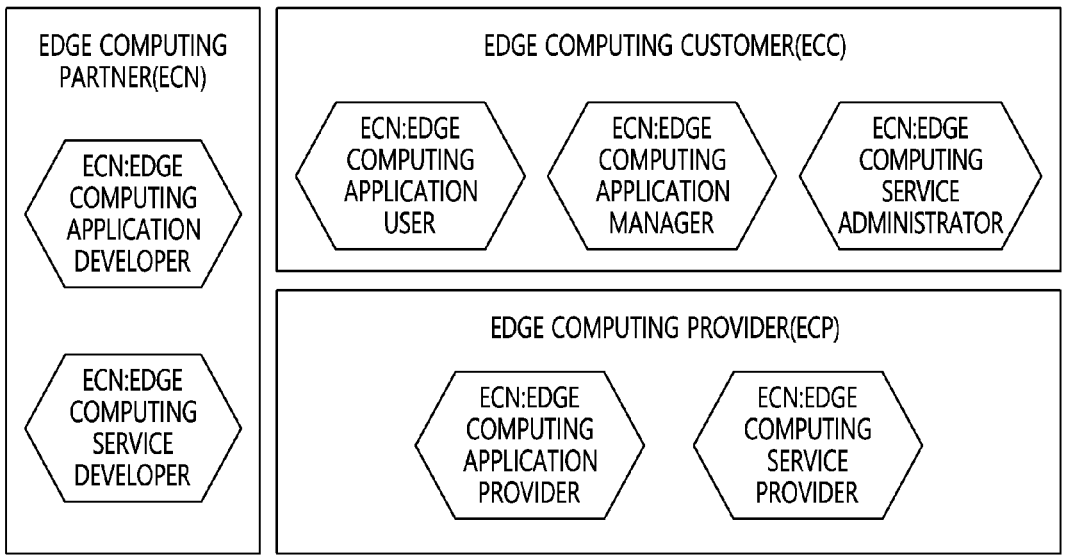
FIG. 3 is a view illustrating an edge computing ecosystem according to an embodiment of the present disclosure.

FIG. 3 is a view illustrating an edge computing ecosystem according to an embodiment of the present disclosure.

Referring to FIG. 3, it can be seen that basic parties involved in performing edge computing and the role of a corresponding task in an edge computing ecosystem are illustrated.

The primary roles in edge computing may include an edge computing (EC) customer (ECC), an EC partner (ECN), and an EC provider (ECP).

The edge computing customer (ECC) is a party corresponding to a natural person or organization acting on behalf of a related ECC in a business relationship in order to use an edge computing application or an edge computing service.

The primary activities of the ECC include using edge computing applications, performing business management for edge computing services, and managing edge computing applications, but are not limited thereto.

From the perspective of the edge computing customer, the ECC is a customer that uses an edge computing application through an edge computing service having edge computing capabilities. However, the customer using the EC service may be a developer who develops a new edge computing service and a developer who develops an edge computing application using the edge computing service. Also, an EC service user may do the same activity as the edge computing partner.

The sub-roles and activities of the ECC may include an edge computing application user (ECC:AU), an edge computing service administrator (ECC:SA), and an edge computing application manager (ECC:AM).

The edge computing application user (ECC:AU) may use an edge computing application that is end-to-end business logic transferred to the user.

The edge computing service administrator (ECC:SA) may guarantee the normal operation of an edge computing service, monitor the edge computing service and an edge computing infrastructure related to the edge computing service, and process matters, such as provision, upgrade, installation, and configuration of an interface for developers.

The edge computing application manager (ECC:AM) may perform EC application management and business management.

The edge computing partner (ECN) may be a party that supports the activities of an edge computing provider, an edge computing customer, or both the edge computing provider and the edge computing customer. The activities of the ECN may vary depending on a partner type and the relationship between the edge computing provider and the edge computing service.

The sub-roles and activities of the ECN may include an edge computing service developer (ECN: SD) and an edge computing application developer (ECN:AD).

The edge computing service developer (ECN: SD) may enable edge computing capabilities and develop a new edge computing service to be integrated with the current edge computing service.

The edge computing application developer (ECN:AD) may integrate and develop an EC application and data using an edge computing service.

The edge computing provider (ECP) is a party that provides edge computing applications capable of being used by an ECC and edge computing services capable of being used by an ECC and an ECN. The activities of the ECP may include providing, managing, and operating edge computing services and edge computing applications in order to provide edge computing capabilities to an ECC.

The sub-roles and activities of the ECP may include an edge computing application provider (ECP:AP) and an edge computing service provider (ECP: SP).

The edge computing application provider (ECP:AP) may provide an edge computing application in order to fulfill the business objective of an ECC by acquiring and using an EC service.

The edge computing service provider (ECP: SP) may provide an edge computing service such that an edge computing application can be operated, managed, and developed through edge computing capabilities.

Figure 4:
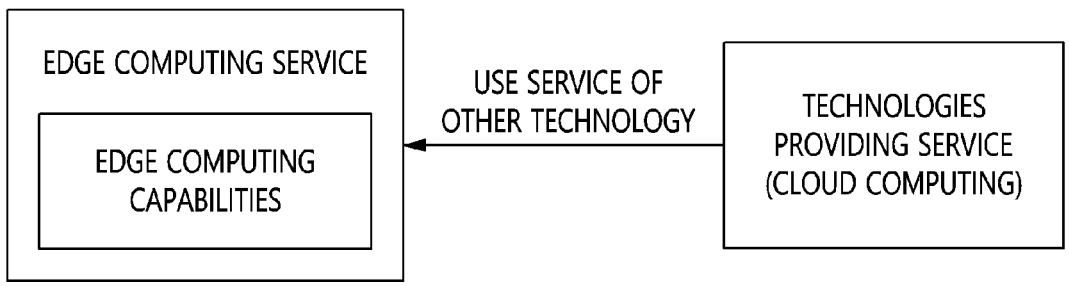
FIG. 4 is a view illustrating a relationship of using a service between edge computing and other technologies according to an embodiment of the present disclosure.
Figure 5:
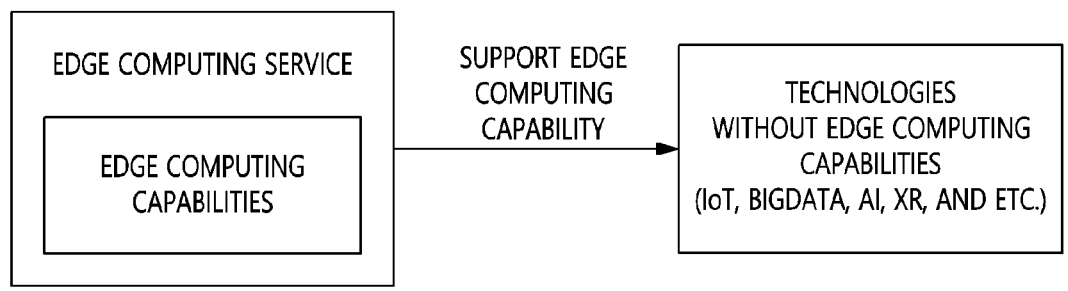
FIG. 5 is a view illustrating a relationship of supporting edge computing capabilities between edge computing and other technologies according to an embodiment of the present disclosure.

FIG. 4 is a view illustrating a relationship of using a service between edge computing and other technologies according to an embodiment of the present disclosure. FIG. 5 is a view illustrating a relationship of supporting edge computing capabilities between edge computing and other technologies according to an embodiment of the present disclosure.

Edge computing may provide an edge computing application using an edge computing service including edge computing capabilities. Although edge computing seems to have no difference from other technologies (e.g., IoT, Bigdata, machine learning, and the like) in that various applications are provided in an infrastructure, but has the following difference. The edge computing capabilities provided by the edge computing service may satisfy common characteristics.

The relationship between edge computing and other technologies may be divided into a relationship of using services and a relationship of supporting edge computing capabilities depending on whether the edge computing capabilities are supported.

Referring to FIG. 4, it can be seen that a relationship of using a service between edge computing and other technologies such as cloud computing is illustrated.

Edge computing may provide edge computing capabilities as an edge computing service by using services of other technologies, such as a cloud computing service. Also, the edge computing service may recreate a new edge computing service using the services of other technologies. Accordingly, an edge computing service may be created by maintaining a complementary relationship with technology providing services, such as cloud computing.

Edge computing may use cloud computing services (e.g., Infrastructure-as-a-Service (IaaS), Platform-as-a-Service (PaaS), Software-as-a-Service (SaaS), and the like) as an edge computing infrastructure.

For example, an IoT service including low latency, cooperation, and data affinity capabilities is provided for an EC service, and IoT functions [ITU-T Y.2068] for computing, storage, and analysis may be performed near an IoT data source. Therefore, IoT services, such as an application service, a platform service, and a network service [ITU-T Y.2066], may be services that are used by an edge computing service in order to enable edge computing capabilities.

Big data may provide on-demand high-performance data processing, distributed storage, and various tools required to perform activities of the Big data ecosystem, as described in [ITU-T Y.3600]. In the case of Big data based on cloud computing, the Big data service may be used as an edge computing service related to a cloud service.

Referring to FIG. 5, it can be seen that a relationship in which edge computing supports an edge computing service for other technologies having no edge computing capabilities in order to satisfy common characteristics required by various technologies is illustrated.

Edge computing may provide applications of other technologies by introducing edge computing capabilities thereto.

An edge computing service may be supported for an IoT application that provides low latency and data preference capabilities related to efficient data management of IoT.

In the case of Big data, a cooperation capability (preprocessing and temporarily storing data in an edge) and a data affinity capability (data processing and analysis near data for processing of large amounts of data) may be provided using an edge computing service in order to provide an analysis service and an infrastructure for a Big data service provider.

Figure 6:
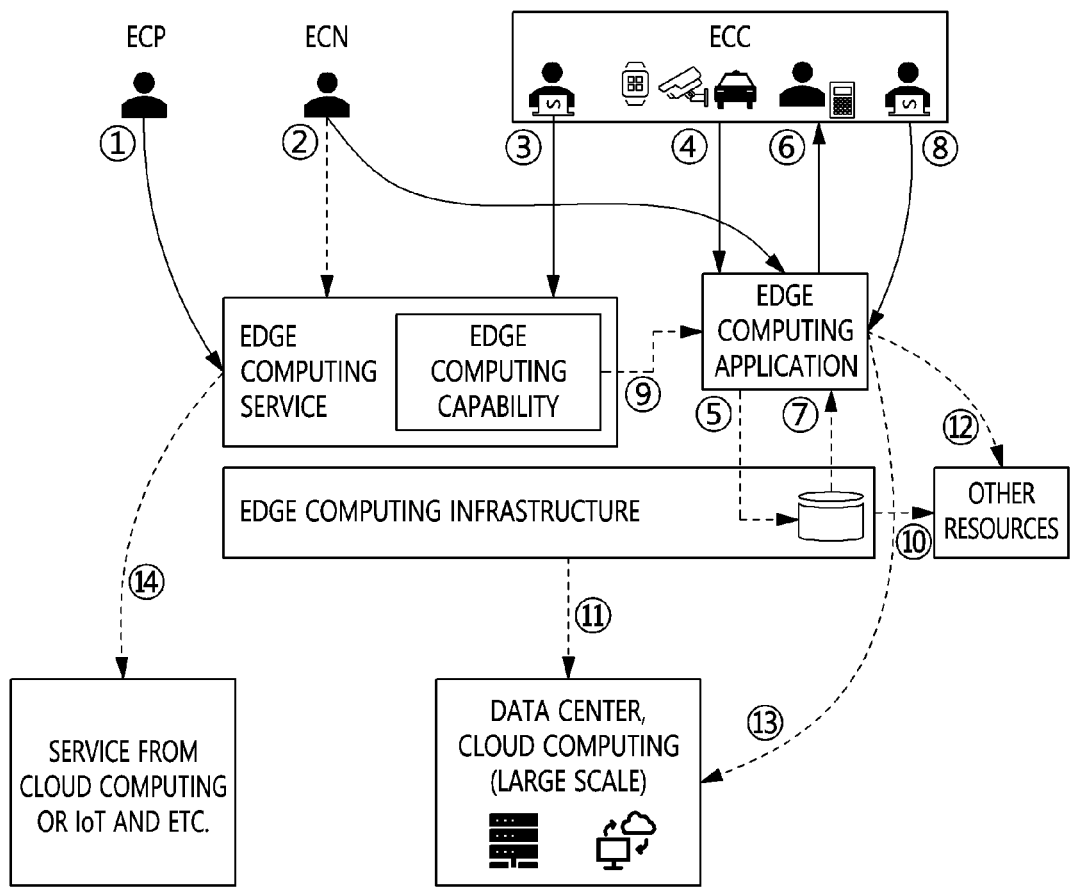
FIG. 6 is a view illustrating a concept model of edge computing according to an embodiment of the present disclosure.

FIG. 6 is a view illustrating a concept model of edge computing according to an embodiment of the present disclosure.

Referring to FIG. 6, it can be seen that a concept model of edge computing is illustrated in order to explain the activities of edge computing.

The concept model of edge computing may be derived from the concept and ecosystem of edge computing.

The concept model for edge computing shows a relationship between the component part of the edge computing concept of FIG. 1 and the roles and activities of the edge computing ecosystem of FIG. 3. The relationships between the roles and the components are represented using arrows in FIG. 6, and the relationship between the components may be described as follows.

An edge computing provider (ECP) may provide an edge computing service having edge computing capabilities.

An edge computing developer (ECN) may develop an edge computing service, which supports edge computing capabilities, and an edge computing application.

An edge computing service administrator (ECC:SA), among edge computing customers, may control and manage an edge computing service provided to the edge computing developer.

An edge computing customer (ECC) corresponding to a data generator may store data and transmit data for data affinity using an edge computing application.

An edge computing application may store data in storage of an edge computing infrastructure that is close to the physical location thereof.

An edge computing application user (ECC:AU), among the edge computing customers, may use an edge computing application and consume data based on user proximity.

The edge computing application may process or transmit data in response to a request from the ECC:AU.

An edge computing application manager (ECC:AM), among the edge computing customers, may control and manage the edge computing application to be provided to the ECC:AU.

The edge computing service may provide the edge computing capabilities to the edge computing application.

The edge computing infrastructure is connected with other resources, thereby expanding a resource for a network connection capability.

The edge computing infrastructure may be connected with a data center or cloud computing for the network connection capability.

The edge computing application may be replicated or migrated to other resources for a cooperation capability.

The edge computing application may be offloaded to a large-scale data center for the cooperation capability.

The edge computing service may create a new edge computing service or may reuse the service for cloud computing, IoT, or the like.

Figure 7:
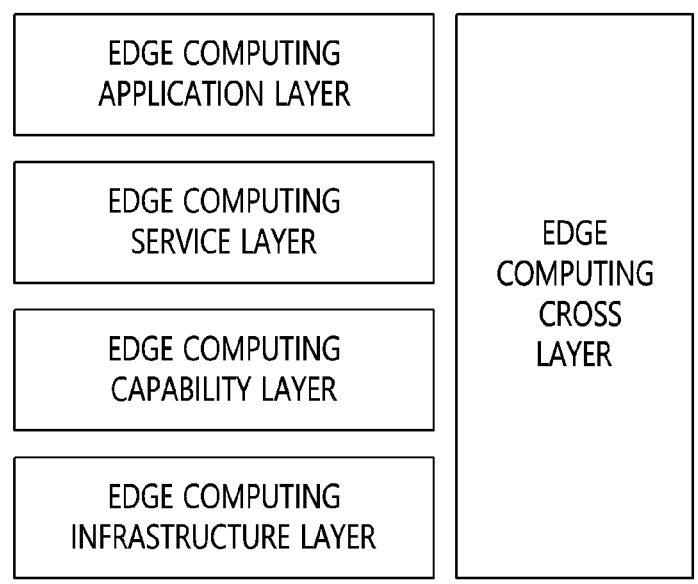
FIG. 7 is a view illustrating a layered architecture of edge computing according to an embodiment of the present disclosure.

FIG. 7 is a view illustrating a layered architecture of edge computing according to an embodiment of the present disclosure.

Referring to FIG. 7, it can be seen that the layered architecture of edge computing is illustrated in order to explain the architecture of edge computing in the conceptual model of edge computing.

The layered architecture of edge computing is introduced from the architecture of the conceptual model and ecosystem of edge computing. The respective layers of edge computing may represent a set of capabilities required for various roles and sub-roles of the conceptual model and ecosystem related to edge computing capabilities.

The layered architecture of edge computing may provide interfaces between functions by grouping the capabilities of specific layers related to the ecosystem and the concept of edge computing from the technical perspective of edge computing.

The layered architecture of edge computing may include an edge computing application layer, an edge computing service layer, an edge computing capability layer, an edge computing infrastructure layer, and an edge computing cross layer as the grouped functions.

The edge computing application layer may include an interface through which an ECC interacts with an edge computing application and performs a customer-related management activity for the edge computing application.

Here, the edge computing application layer may provide an interface for accessing an edge computing service and an edge computing application. Accordingly, the ECC may use the edge computing service or the edge computing application and apply a suitable security mechanism through various interface mechanisms.

Here, the access interface may include an interface for providing the application to the ECC, an interface for managing the edge computing application, and an interface for the edge computing service.

Here, the security mechanism may include a set of webpages accessed through a browser, an API set accessible using a programming method in secure communication, and a gateway for maintaining access control.

Also, the edge computing application layer may authenticate a request from the ECC using authorization certificates and check the authority of the ECC for the use of the edge computing service and the edge computing application.

Also, the edge computing application layer may generate a policy depending on the requirements of the edge computing application for performing edge computing functions and transfer the verified request of the ECC to the edge computing service layer.

The edge computing service layer may enable edge computing capabilities in an edge computing infrastructure. Accordingly, the edge computing service layer may provide various edge computing capabilities to an edge computing application.

Enabling the edge computing capabilities means connecting the requirements of the ECC or the policy with the edge computing application through connection of the edge computing capability and distributing the edge computing application to the edge computing infrastructure.

For example, enabling the edge computing capabilities may comprise connecting a software module for supporting a high-speed mobile network (e.g., 5G) to an edge computing application and deploying the same in an edge computing infrastructure close to an ECC in order to enable a low-latency capability.

The edge computing service layer may include various types depending on the edge computing capability and the resources and configuration of the edge computing infrastructure.

Through the edge computing service layer, an ECN may develop a new edge computing service or an edge computing application. Also, the edge computing service layer may provide a user interface for the edge computing service to the ECN. An ECP may use services of other technologies, such as cloud computing and IoT, in order to create a new edge computing service through the edge computing service layer.

The edge computing service layer may provide service exposure to each infrastructure so as to enable retrieval of an edge computing application interface (an IP address, a domain name, or a URL) through which each edge computing infrastructure can be accessed depending on the edge computing application.

The edge computing service layer may provide a load balancer or a high availability proxy in order to support a seamless service in the event of service transfer. The high availability proxy or the load balancer may check a connection, and may perform failover through a new connection using service exposure when the connection is disconnected.

The edge computing service layer may reflect the policy required by the edge computing application to the edge computing capability layer. Also, the edge computing service layer may support a Service Level Agreement (SLA) for secure connection between an ECC and an ECP.

The edge computing capability layer may provide edge computing capabilities for low latency, network connectivity, data affinity, cooperation, automated orchestration, and the like. The edge computing capability layer may provide edge computing capabilities satisfying common characteristics of edge computing applications to the edge computing service layer and support a combination of edge computing capabilities for applying a policy to the edge computing applications.

The edge computing capability layer may include interfaces for implementation and configurations related to an edge computing infrastructure for an ECP and an edge computing service. Also, the edge computing capability layer may provide functions for controlling and managing each capability of edge computing for an edge computing application.

The edge computing infrastructure layer may provide resources for supporting edge computing capabilities.

The edge computing infrastructure layer provides a network interface for the edge computing capability layer, thereby supporting a high-performance network that provides a low-latency capability.

The network interface of the edge computing infrastructure layer may include transport networks required for providing network connections between an ECP and an edge computing application, between ECPs, or between ICT infrastructures, such as cloud computing, IoT, Big data, and the like.

The edge computing infrastructure layer may provide high-performance resource allocation for offloading of an edge computing application in order to support a cooperation capability.

The resources for high-performance computing may include a Graphics Processing Unit (GPU), a Tensor Processing Unit (TPU), a Field-Programmable Gate Array (FPGA), and high-performance-memory-based computing.

Also, the edge computing infrastructure layer may provide high-speed transfer of an edge computing application to an edge computing infrastructure that is physically close thereto.

Also, the edge computing infrastructure layer may support high-speed distributed storage for data affinity and provide shared storage for minimizing resource transfer between infrastructures.

The edge computing infrastructure layer may support access to the infrastructure resource and provide an interface in order to implement EC capabilities.

The edge computing cross layer may include various capabilities for interacting with the four layers described above. The edge computing cross layer may provide support of edge computing capabilities, such as orchestration, adjustment, and scheduling of an edge computing application, cooperation with an edge computing infrastructure and resources, a network connection, and the like.

Also, the edge computing cross layer may provide integrated support for the edge computing capabilities and the edge computing service.

Also, the edge computing cross layer may provide management support, business support, and security support related to an edge computing service, and developer support for an edge computing application and an edge computing service.

An orchestrator for edge computing may actively optimize allocation and use of resources in response to a change in the size of the edge computing infrastructure or in the use pattern thereof.

The orchestrator may dynamically establish a policy, include an intelligent orchestrator based on log data analysis, minimize the cost incurred due to policy change scheduling, and minimize latency/delay time.

The orchestrator may perform global management of various edge computing infrastructures connected through software (e.g., an agent or a module) or management of a single resource of an edge computing infrastructure.

Figure 8:
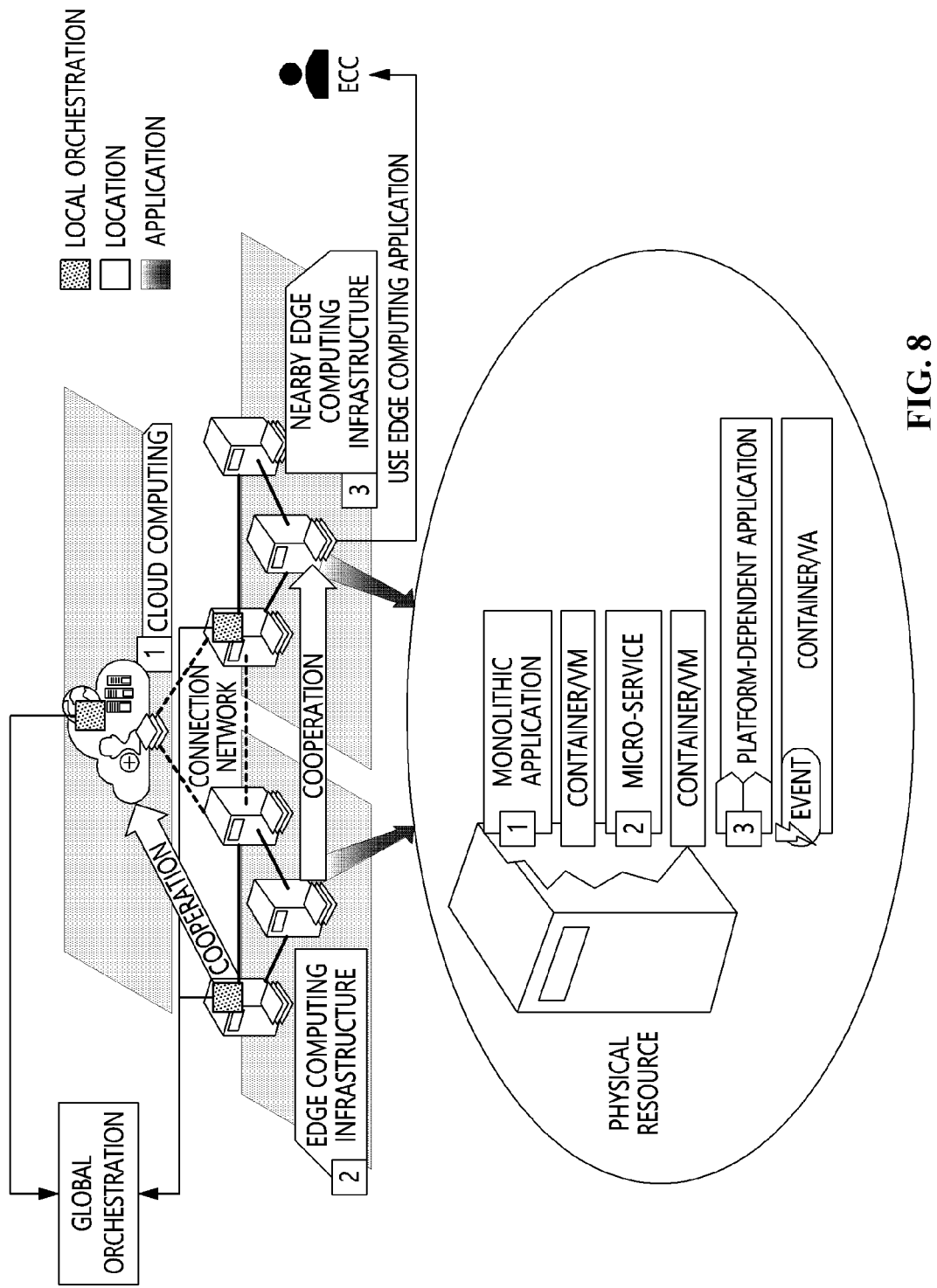
FIG. 8 is a view illustrating a detailed functional structure for cooperation of edge computing according to an embodiment of the present disclosure.

FIG. 8 is a view illustrating a detailed functional structure for cooperation of edge computing according to an embodiment of the present disclosure.

Referring to FIG. 8, edge computing may use part of an enterprise data center or other technology services, such as a cloud computing service, an IoT service, and the like. Also, edge computing may distribute edge computing applications to an edge computing infrastructure, such as a processor, storage, or various networks, close to an ECC.

Also, edge computing may provide a low-latency capability for data processing between cloud computing and an enterprise data center including an edge computing infrastructure.

Here, the low-latency capability and the cooperation capability of edge computing may provide data processing faster than a response of a centralized cloud infrastructure by selectively using an edge computing infrastructure close to an ECC. Accordingly, edge computing may ensure the stability of a critical real-time service for essential safety.

Edge computing may provide a cloud-computing-service-related edge computing service that processes data at a location close to an edge computing application in order to overcome data processing and transmission delays caused due to centralization of data generated by a large-scale data generator.

Edge computing may provide a high-speed network for connecting multiple clusters as a container-based edge computing infrastructure and provide an edge computing service using the clusters.

As illustrated in FIG. 8, the detailed functional structure for cooperation of edge computing shows cooperation between cloud computing, an edge computing infrastructure, and a nearby edge computing infrastructure. The cooperation is configured with storage for connecting a cluster and the edge computing infrastructure through a network connection capability. For an automated orchestration capability, edge computing may orchestrate an edge computing application and an edge computing service using a global orchestrator connected with local orchestrators.

The edge computing infrastructure may include cloud computing, the nearest edge computing infrastructure, and a nearby edge computing infrastructure.

Also, the edge computing application may include a monolithic application service, a microservice, and an application service dependent on a specific platform (FaaS, PaaS, a serverless computing platform, and the like).

The edge computing infrastructure may provide a high-performance architecture for efficient cooperation between clusters.

Here, the edge computing infrastructure configures a high-performance container using high-speed storage (main memory, RAM, Non-Volatile Memory Express (NVMe), and the like) in order to improve container efficiency.

The edge computing infrastructure may provide a high-speed network connection between clusters for cooperation. Edge computing may provide various functions for high-speed networks, such as a gateway for a cluster master, tunneling between clusters, high-speed routing for clusters for providing cooperation between the clusters, and the like.

The edge computing infrastructure may provide orchestration technology for cooperation between clusters. Orchestration of edge computing may provide a global orchestrator and a local orchestrator in each cluster. Through intelligent scheduling for optimizing cooperation between cloud computing and the edge computing infrastructure, an ECN may develop an edge computing application so as to be distributed to the nearby edge computing infrastructure.

Also, edge computing may provide an edge computing infrastructure at or near a physical location of an ECC in order to operate an edge computing application (user proximity).

Edge computing may provide minimized latency by considering user proximity (latency minimization).

Edge computing may provide a network connection with an edge computing infrastructure at or near the physical location of an ECC (network connectivity for the infrastructure).

The network connection may include infrastructures of other technologies (e.g., cloud computing, IoT, Bigdata, and the like) provided in the service.

Edge computing may provide data close to an edge computing application (data affinity).

Edge computing may support an edge computing application with mobility (mobility support).

Edge computing may provide interfaces of an edge computing infrastructure (infrastructure availability).

Edge computing may provide cooperation between infrastructures in order to solve problems related to resource constraints and user proximity (cooperation between infrastructures).

Edge computing may provide resources of an edge computing infrastructure for cooperation between infrastructures (use of resources).

Edge computing may provide intelligence to automated orchestration (automated orchestration).

Edge computing may provide user authentication in order to allow a user to access user data in a resource (user authentication).

Edge computing may provide a protection mechanism for data privacy (data privacy).

Edge computing may provide management of an edge computing infrastructure, an edge computing service, and an edge computing application (management for edge computing).

The edge computing management may include monitoring an edge computing infrastructure including a processor, a network, and storage.

Edge computing may provide an edge computing service using edge computing capabilities (provision of a service).

Enabling edge computing capabilities may include software for automatically operating edge computing capabilities (e.g., an automatic operator or a self-running operator).

Figure 9:
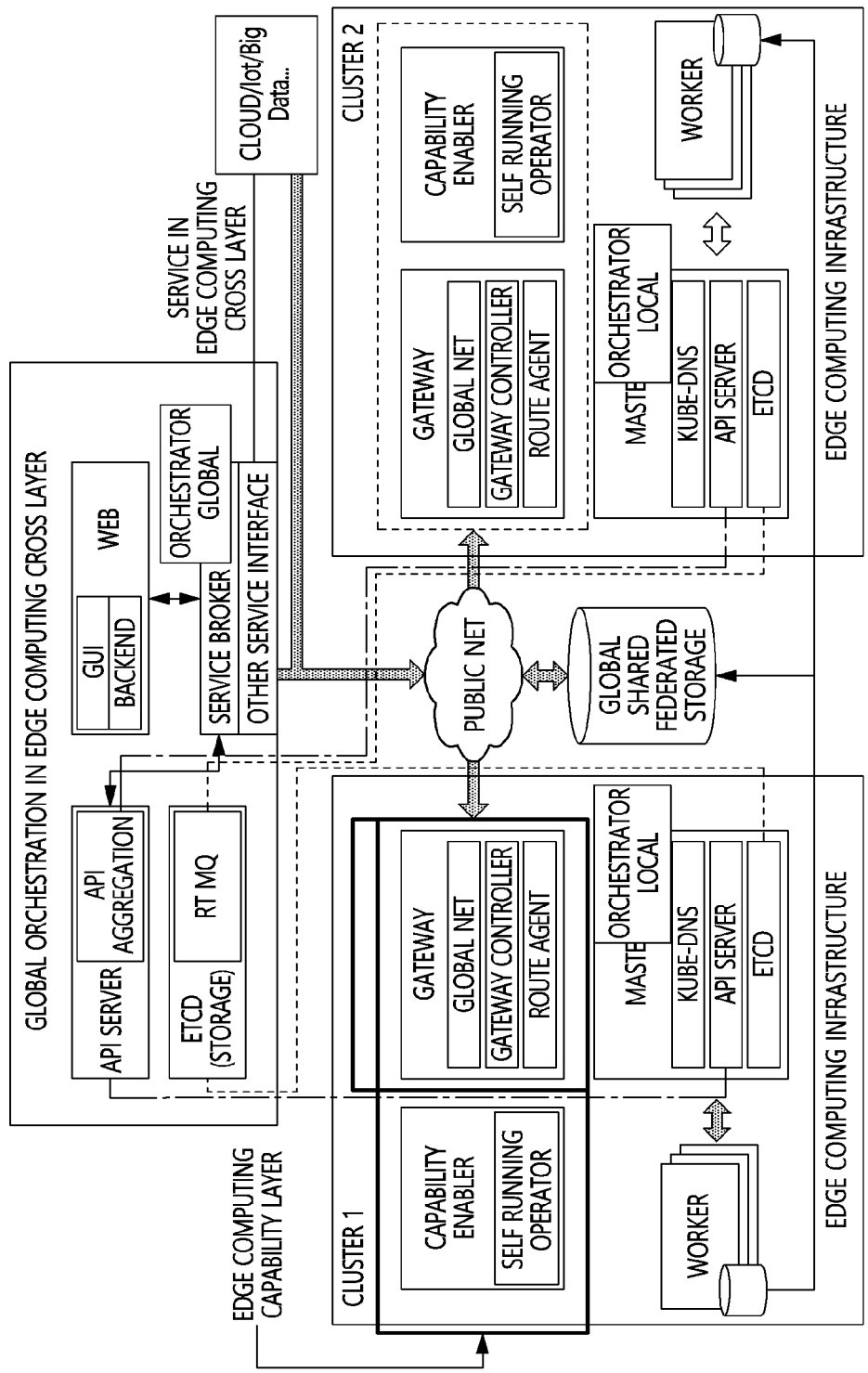
FIG. 9 is a view illustrating a detailed connection structure of edge computing according to an embodiment of the present disclosure.

FIG. 9 is a view illustrating a detailed connection structure of edge computing according to an embodiment of the present disclosure.

Referring to FIG. 9, edge computing may smoothly provide an edge computing service, process large amounts of data, and maximize the efficiency of a distributed environment.

Here, edge computing may provide the cooperation capability of edge computing for a horizontally distributed environment between cloud edges and a vertically distributed environment between a cloud edge and a core cloud.

Here, edge computing may provide interconnection between clusters and high-speed distributed deployment technology for local distributed deployment of services applied in a distributed environment and a high-speed network connection.

Here, edge computing may provide a network connection function and an interface therefor on multiple cluster nodes of an edge system of an edge cloud.

Here, edge computing may provide functions for fast data transfer and connection with storage, together with the network connection function.

As illustrated in FIG. 9, the detailed connection structure of edge computing may provide the network connection function on multiple clusters in order to connect an edge computing infrastructure with other services.

The network connection function may connect different networks in order to use a nearby edge and provide a seamless service depending on a mobile service of a cloud edge.

Edge computing may provide a high-speed gateway function (a gateway engine) for connecting multiple clusters over a network and a basic routing function (a route engine) for recognition in the cluster. The gateway and the router are for a management function on a cluster, and may be locally distributed through a global scheduler.

The high-speed gateway is a network connection mechanism for connecting and operating the multiple clusters at high speeds, and the connection may be made using tunneling between two networks. Tunneling may guarantee reliable data transfer by encapsulating payloads in the tunneling section and using a specific protocol. Tunneling may be applied to layers L7, L3, and L2 of the 7 layers of the Internet. As the layer at which tunneling is supported is lower, a lot of protocols used in the upper layers may be used without change and fast performance may be provided.

The edge computing cross layer may connect two clusters using tunneling of L3. Tunneling of L3 may establish a connection with a tunneling network using a user-level network driver (a Data Plane Development Kit (DPDK)) for kernel bypass. Also, the interface between a master node and a worker node may be connected with the tunneling interface through a bridge, and may be connected with a network configured with an existing overlay network.

The edge computing cross layer may provide a high-speed gateway engine function, a global shared cache function, and a router agent function.

The high-speed gateway engine function may perform a multi-cluster tunneling function of layer L3 using a user-level network driver.

The global shared cache function may generate high-speed shared storage using a network-based storage system using memory-based storage.

Here, the global shared cache function is a storage function for sharing data by being connected with a local shared cache, and storage in the master node may be used as the network-based shared storage.

The router agent function may be executed in all nodes, may configure a route using endpoint resources synchronized in other clusters, and may enable a connection between all clusters. Here, the router agent function may set the rule of Iptable.

The Iptable may include a routing table of the gateway engine in order to communicate by being connected with the gateway engine.

Figure 10:
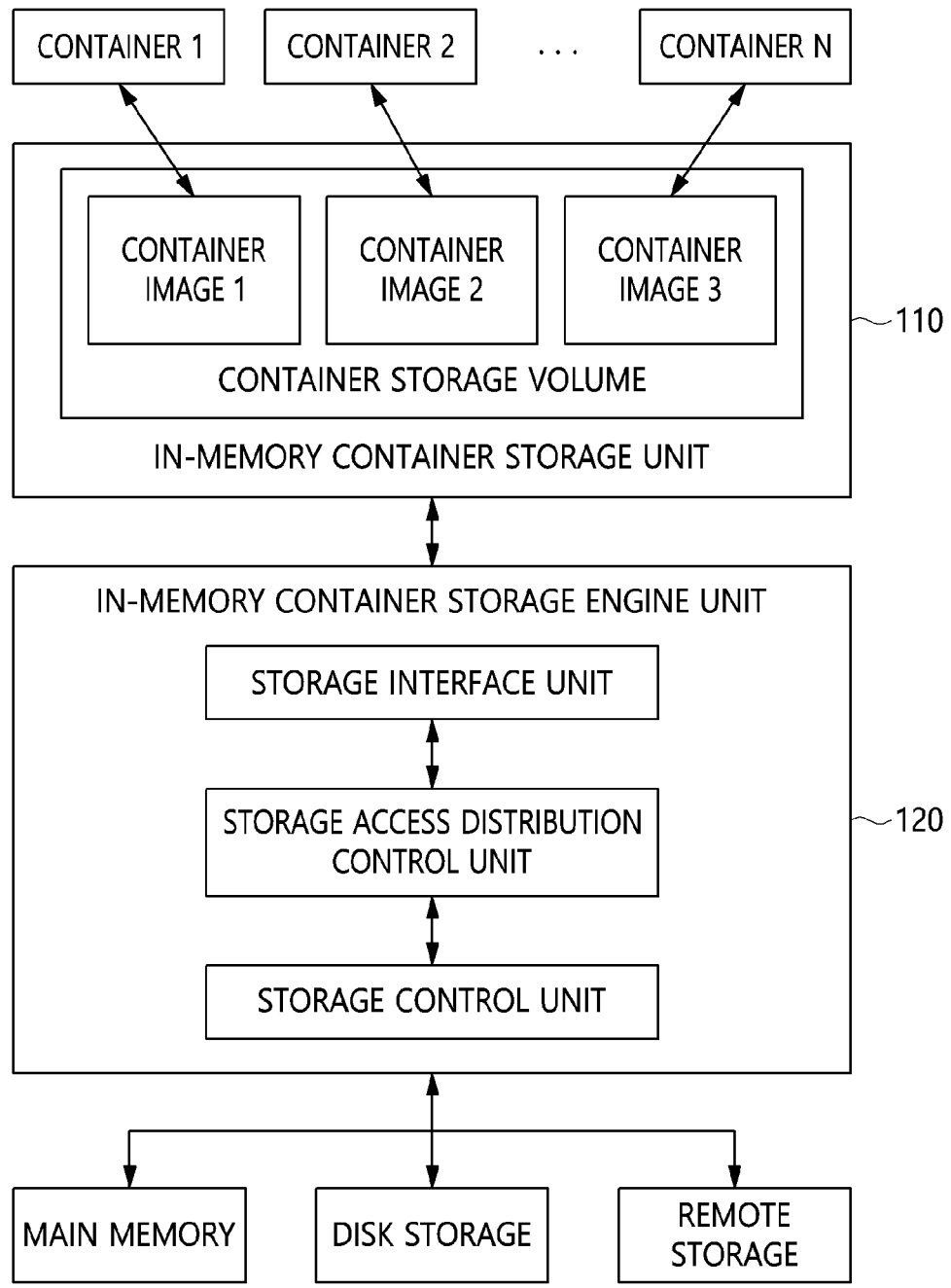
FIGS. 10 and 11 are block diagrams illustrating in-memory-based container storage according to an embodiment of the present disclosure.
Figure 11:
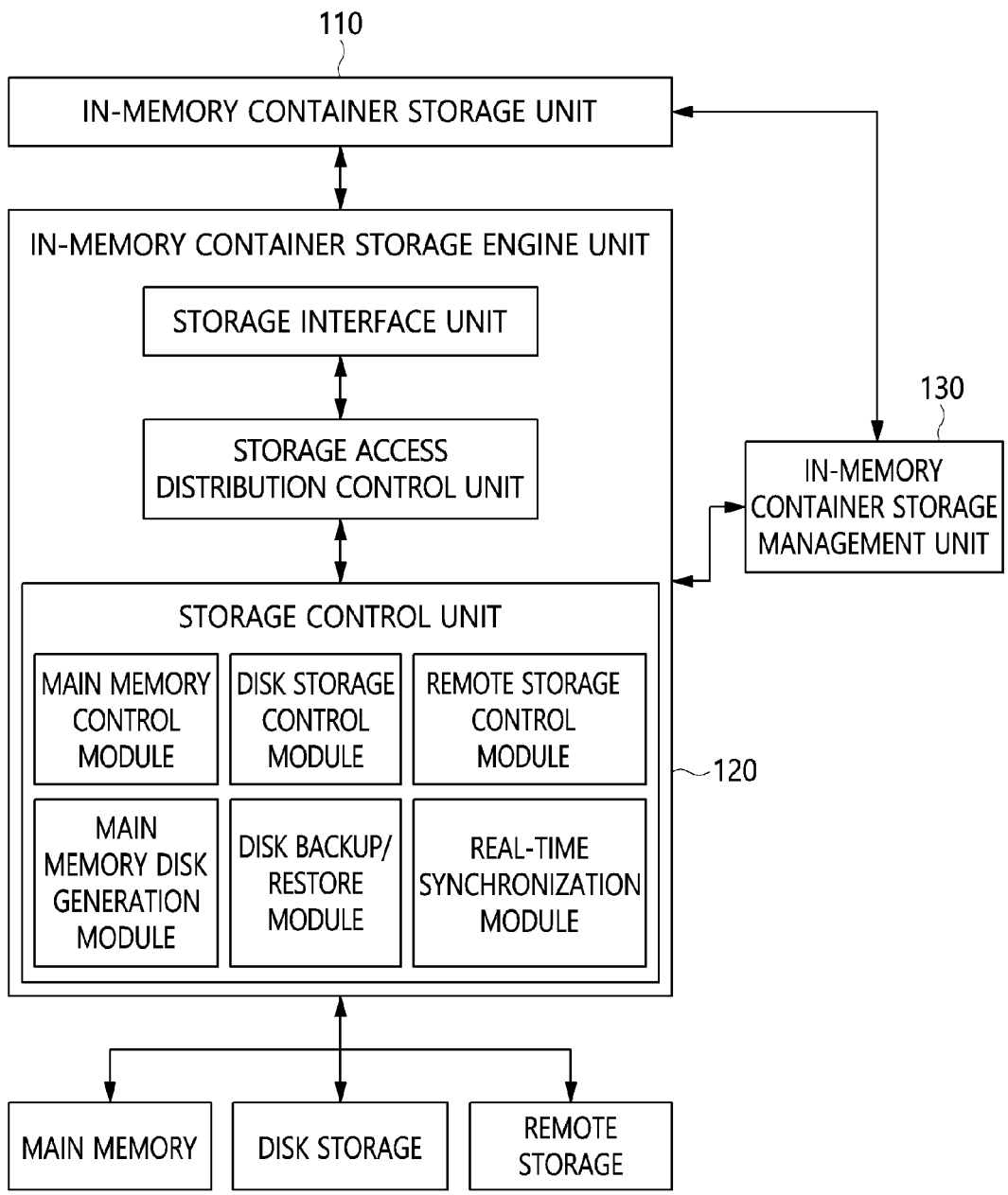

FIG. 10 and FIG. 11 are block diagrams illustrating in-memory-based container storage according to an embodiment of the present disclosure.

Referring to FIG. 10 and FIG. 11, the in-memory-based container storage according to an embodiment of the present disclosure includes an in-memory container storage unit 110, an in-memory container storage engine unit 120, and an in-memory container storage management unit 130.

The in-memory-based container storage according to an embodiment of the present disclosure may correspond to a repository for managing monitoring information, which is configured in each of the above-described clusters.

The in-memory container storage unit 110 may generate a container storage volume by generating container images from multiple containers.

Here, the in-memory container storage unit 110 may include storage on main memory having nonvolatile characteristics.

Here, the in-memory container storage unit 110 may generate and operate a volume of a file system (e.g., /var/lib/docker in the case of a Docker) in which a container is run.

The in-memory container storage engine unit 120 may generate in-memory container storage configured as a container storage volume in the form of a single storage unit in the in-memory container storage unit 110 by integrating main memory, disk storage, and remote storage.

Here, the in-memory container storage engine unit 120 may include a container file system for storing containers providing application virtualization, and the container file system may include an integrated access layer, a container layer, and an image layer.

Here, the container storage volume may include an integrated access area, a container layer, and an image layer, and may be configured as a container file system in which integrated processing of the respective layers is performed using a unifying file system function.

Here, the container file system may perform integrated processing of the layers using the unifying file system function.

Here, the unifying file system function may mount user directories and relevant directories included in the layers of the container files system, and may perform integrated processing for the user directories and the relevant directories.

Here, the image layer may include subdirectories in which link information is stored.

Here, the container layer may store differential information on update details of the image layer depending on access by a user.

Here, the area of the integrated layer may include a user directory through which a file requested by the user to be shared is shared by accessing the link information of the image layer through the container layer.

Here, the in-memory container storage unit 110 may be operated without modification by providing a standard block storage interface.

The in-memory container storage unit 110 may receive a container access command generated in a container.

The in-memory container storage engine unit 120 may generate in-memory container storage in the form of a single storage unit by integrating main memory, disk storage, and remote storage.

The in-memory container storage engine unit 120 may process a disk access command using the main memory, the disk storage, and the remote storage in an integrated manner.

The in-memory container storage engine unit 120 may include a storage interface module, a storage access distribution module, and a storage control module.

The storage interface module may provide an interface of a standard block storage format and receive a disk access command generated in a container. The received command may be transferred to the storage access distribution module.

Depending on the characteristics of the disk access command, the storage access distribution module may determine whether to use the main memory storage, the disk storage, or the remote storage in order to perform a service, and may transfer the access command to a main-memory control module, a disk storage control module, or a remote storage control module.

The main-memory control module may process the disk access command using main memory, thereby providing high-speed access.

A main memory disk generation module may perform actual read/write operations on the main memory, which is accessible by address, in response to disk access commands in units of blocks. Accordingly, the main memory disk generation module may store data of a virtual disk in the main memory.

The disk storage control module may process a virtual disk access command using the disk storage.

The in-memory container storage management unit 130 may provide shared data to a user.

Here, the in-memory container storage management unit 130 may provide a sharing management function of shared storage through a container file system layer management module, and may individually configure an area for file sharing and provide the same to a user.

Here, the in-memory container storage management unit 130 may provide an application with information about links to files in the container layer and the image layer in response to a request from the user, thereby allowing the application to access the files.

Figure 12:
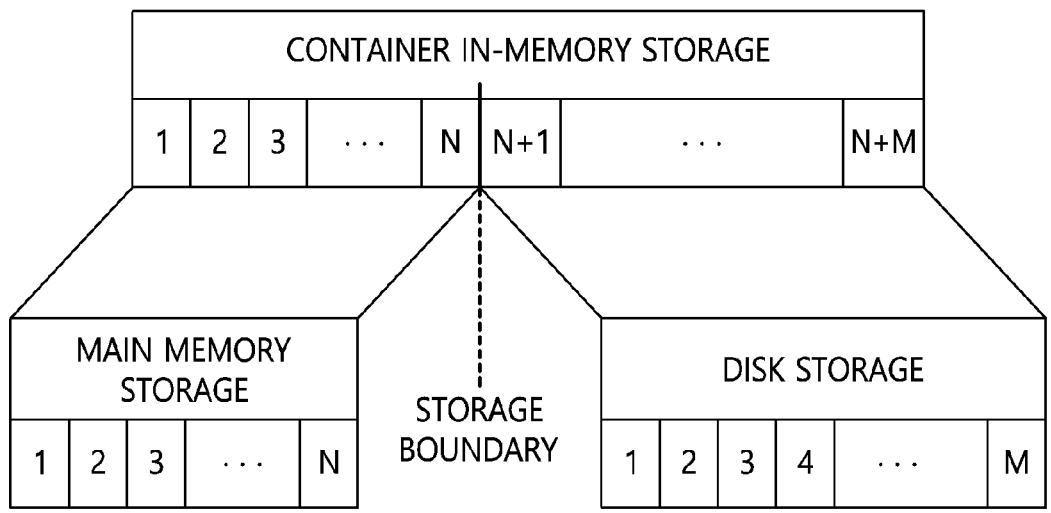
FIG. 12 is a view illustrating a process of generating container in-memory storage according to an embodiment of the present disclosure.

FIG. 12 is a view illustrating a process of generating container in-memory storage according to an embodiment of the present disclosure.

Referring to FIG. 12, it can be seen that a process of generating a single hybrid form of in-memory storage by integrating main memory storage and disk storage is illustrated. The container in-memory storage provides a standard block storage format, and it can be seen that a main memory storage area is mapped to the front part of the storage and a disk storage area is mapped to the rear part thereof.

Block IDs 1 to N of the main memory storage are mapped to block IDs 1 to N of the container in-memory storage. Block IDs 1 to M of the disk storage are mapped to block IDs N+1 to N+M of the container in-memory storage. Also, a storage boundary is set between the block having an ID of N and the block having an ID of N+1 in the container in-memory storage.

Schedulers according to an embodiment of the present disclosure may include a scheduler capable of dynamic policy establishment, an intelligent scheduler based on log data analysis, and schedulers for minimizing cost incurred due to a change in a scheduling policy and minimizing latency and delay time.

The target to be scheduled by the schedulers according to an embodiment of the present disclosure may include a resident container for executing a monolithic application or a microservice and a nonresident container for executing a service-type function (Function-as-a-Service (FaaS)).

Figure 13:
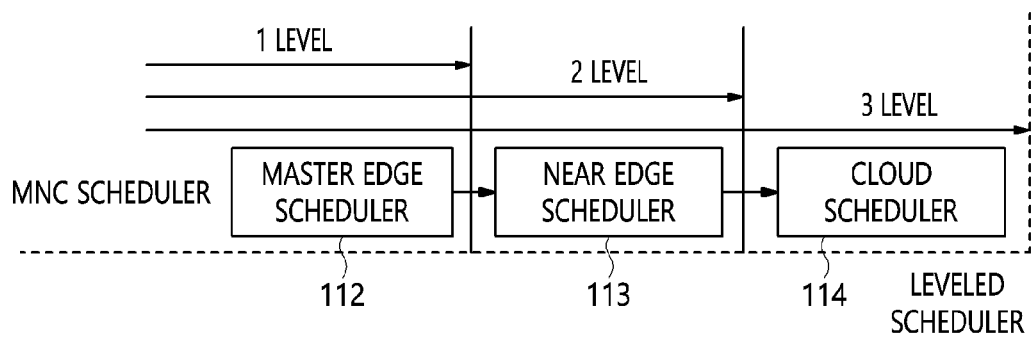
FIG. 13 is a view illustrating an example in which schedulers of an edge service system are configured as leveled schedulers according to an embodiment of the present disclosure.

The schedulers according to an embodiment of the present disclosure may include four schedulers, which include a global edge scheduler 111 and three schedulers 112, 113, and 114, corresponding to the above-mentioned three locations, as illustrated in FIG. 13.

The global edge scheduler 111 may correspond to a scheduler for connecting a master edge scheduler 112, a near edge scheduler 113, and a cloud scheduler 114, and may alternatively correspond to a global scheduler 110 included in an intelligent scheduler device 100.

The master edge scheduler 112 may correspond to a scheduler included in an edge (master edge) system 20 in which a main service is run.

The near edge scheduler 113 may correspond to a scheduler included in a near edge system 30 present near the master edge.

The cloud scheduler 114 may correspond to a scheduler included in a public/private cloud 11.

FIG. 13 is a view illustrating an example in which schedulers of an edge service system are configured as leveled schedulers according to an embodiment of the present disclosure.

In the configuration edge service of the schedulers according to an embodiment of the present disclosure, horizontal/vertical cooperation may be applied at a system level. To this end, the schedulers according to an embodiment of the present disclosure may provide a series connection configuration such as leveled schedulers and a parallel connection configuration such as a shared scheduler. The leveled schedulers may be a series connection configuration for sequential processing of the schedulers, and the shared scheduler may be a parallel connection configuration for searching for the optimal condition through the competition between the schedulers.

Referring to FIG. 13, an example of the configuration of leveled schedulers is illustrated, and it can be seen that three-leveled schedulers corresponding to a series connection configuration, in which a master edge scheduler 112, a near edge scheduler 113, and a cloud scheduler 114 are sequentially arranged, are illustrated.

For example, a global edge scheduler 111 may skip execution of the schedulers at levels 2 and 3 when resource allocation by the first master edge scheduler 112 at level 1 succeeds. However, when resource allocation by the first master edge scheduler 112 at level 1 fails, the global edge scheduler 111 may sequentially transfer the task to the near edge scheduler 113 at level 2, which is at the next level, or the cloud scheduler 114 at level 3. A service developer may apply load balancing of an edge service and cooperation between services at the system level by using such leveled schedulers.

Figure 14:
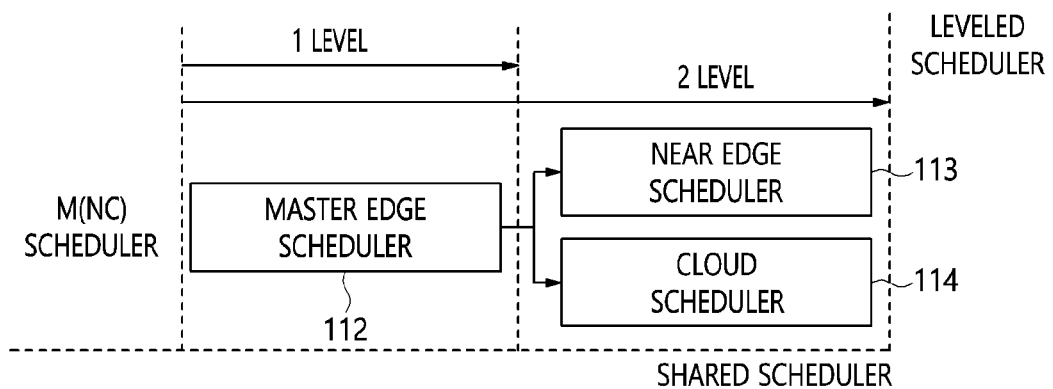
FIG. 14 is a view illustrating in detail an example of a complex configuration in which schedulers of an edge service system are configured as a combination of leveled schedulers and a shared scheduler according to an embodiment of the present disclosure.

FIG. 14 is a view illustrating in detail an example of a complex configuration in which schedulers of an edge service system are configured as a combination of leveled schedulers and a shared scheduler according to an embodiment of the present disclosure.

Referring to FIG. 14, it can be seen that a complex configuration in which leveled schedulers and a shared scheduler are combined is illustrated.

Here, it can be seen that leveled schedulers are configured with two levels and that a near edge scheduler 113 and a cloud scheduler 114 are configured as a shared scheduler at level 2.

In the shared scheduler, a request for a task is simultaneously sent to two or more schedulers, candidates are received from the respective schedulers, and then the most suitable scheduler may be selected.

For example, when resource allocation by the first maser edge scheduler 112 at level 1 fails, a global edge scheduler 111 simultaneously requests the task from the near edge scheduler 113 and the cloud scheduler 114 at level 2 in a competition mode and receives candidates from the respective schedulers, thereby selecting the most suitable scheduler.

Figure 15:
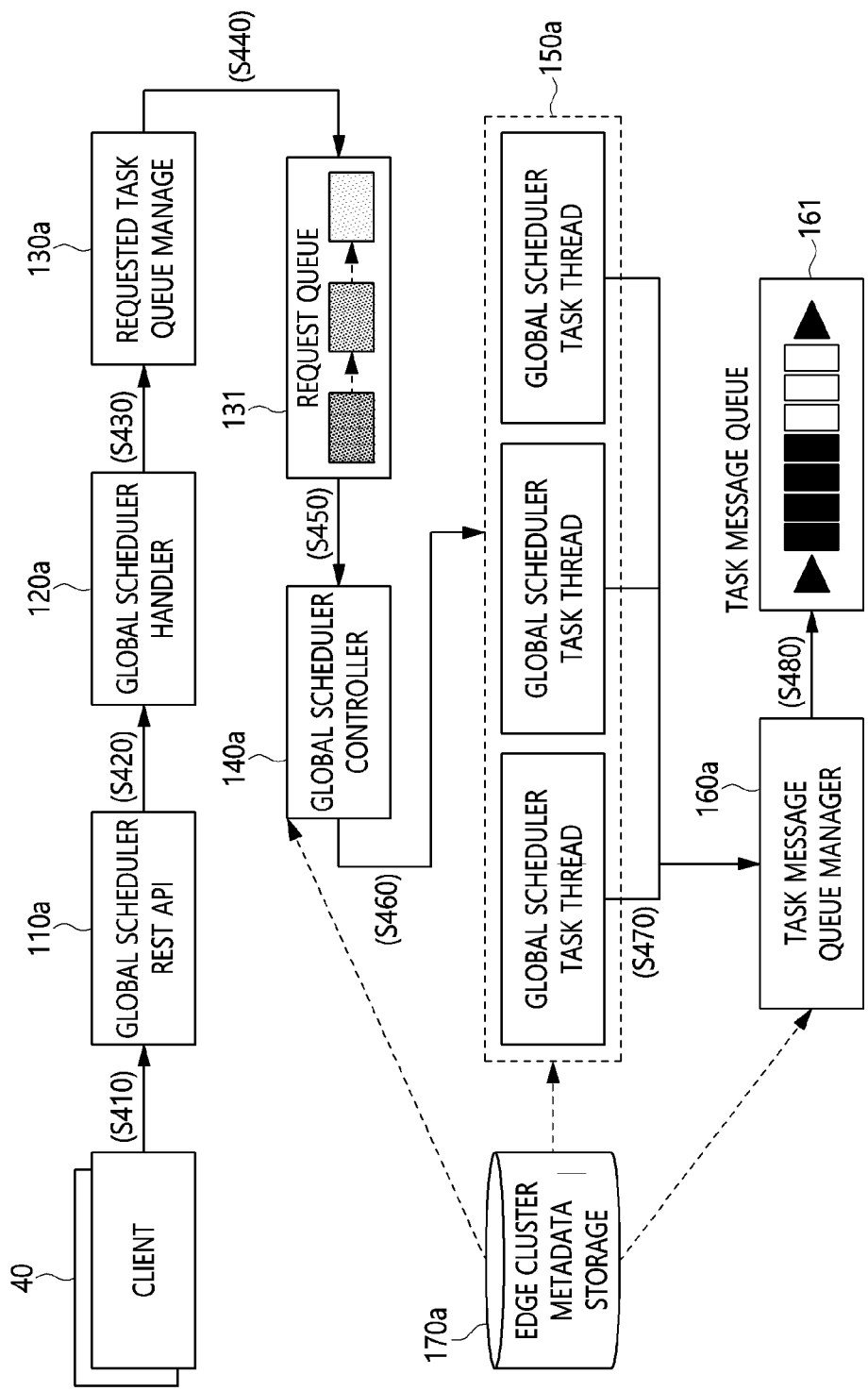
FIG. 15 is a block diagram illustrating a processing flow of an intelligent scheduler according to an embodiment of the present disclosure.
Figure 16:
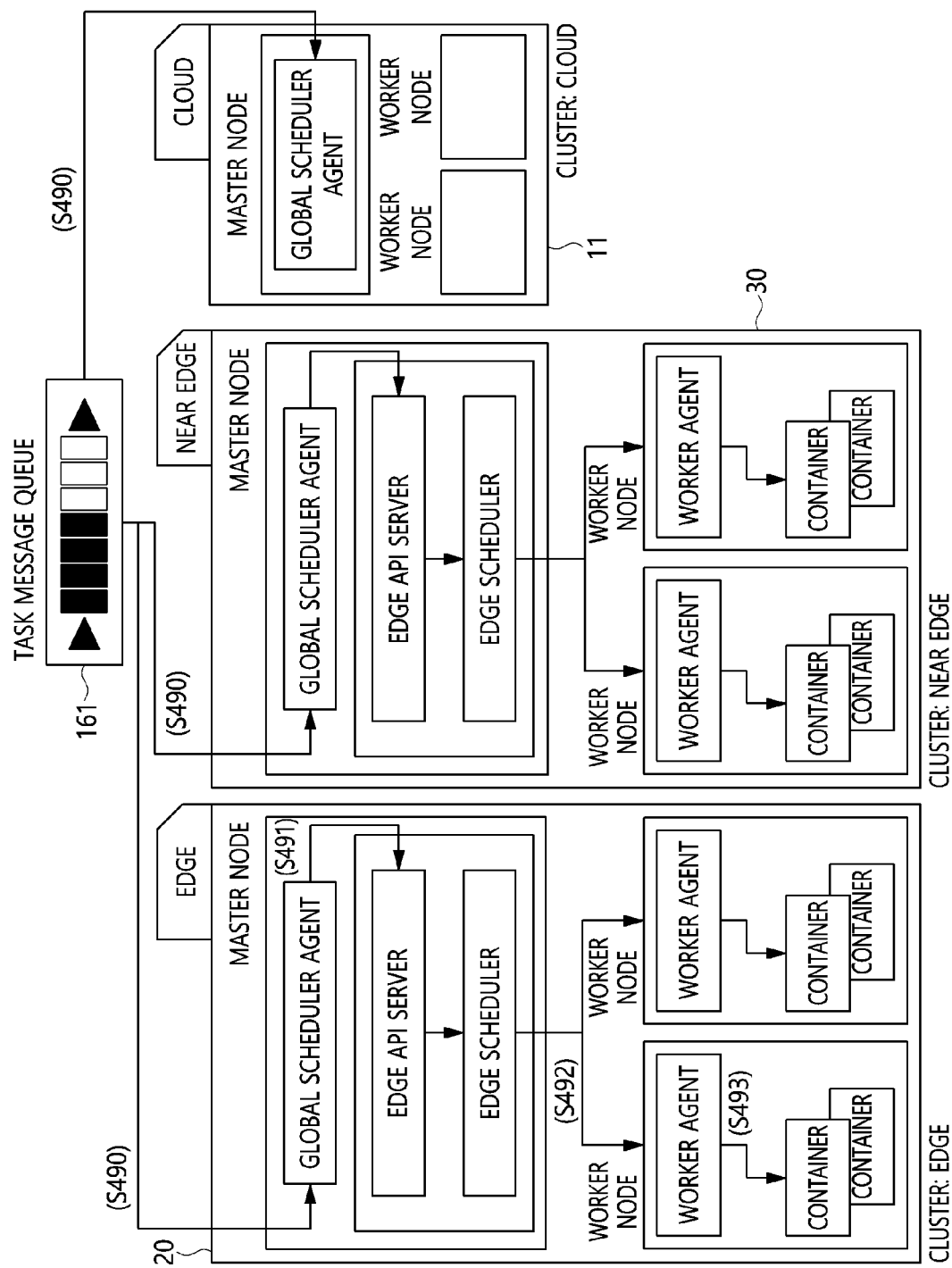
FIG. 16 is a block diagram illustrating a processing flow in an edge, a near edge, and a cloud, which is continued from the processing flow of the intelligent scheduler illustrated in FIG. 15.

FIG. 15 is a block diagram illustrating a processing flow of an intelligent scheduler according to an embodiment of the present disclosure. FIG. 16 is a block diagram illustrating a processing flow in an edge, a near edge, and a cloud, which is continued from the processing flow of the intelligent scheduler illustrated in FIG. 15.

Referring to FIG. 15, it can be seen that, first, a container requested by a client 40 is created and executed in a worker node at step S410.

That is, at step S410, the client 40 may call a REST API corresponding to creation of a container to a global scheduler 110a.

Also, at step S420, the global scheduler 110a may execute a global scheduler handler 120a corresponding to the called REST API.

Also, at step S430, the global scheduler handler 120a may transmit requested data to a request queue manager 130a.

Also, at step S440, the request queue manager 130a may store the requested data in a request queue 131.

Also, at step S450, a global scheduler controller 140a may fetch data to process from the request queue 131 in consideration of priority.

Also, at step S460, the global scheduler controller 140a may generate multiple task threads in a global scheduler task thread 150a and transfer the data to be processed to the global scheduler task thread 150a, thereby performing a task queue scheduling task.

Also, at step S470, the global scheduler task thread 150a may analyze the requested task and transfer a message to be requested from the corresponding clusters 10, 20, and 30 to a task message queue manager 160a.

Also, at step S480, the task message queue manager 160a may store the received message in a task message queue 161.

Referring to FIG. 16, at step S490, a global scheduler agent may check whether a message corresponding to the edge system 20 or the near edge system 30 is present in the task message queue 161 and fetch the corresponding message therefrom.

Also, at step S491, the global scheduler agent may analyze the fetched message and call a corresponding API to the edge API server thereof.

Also, at steps S492 and S493, an edge scheduler may create and execute the requested containers through worker agents in worker nodes.

Figure 17:
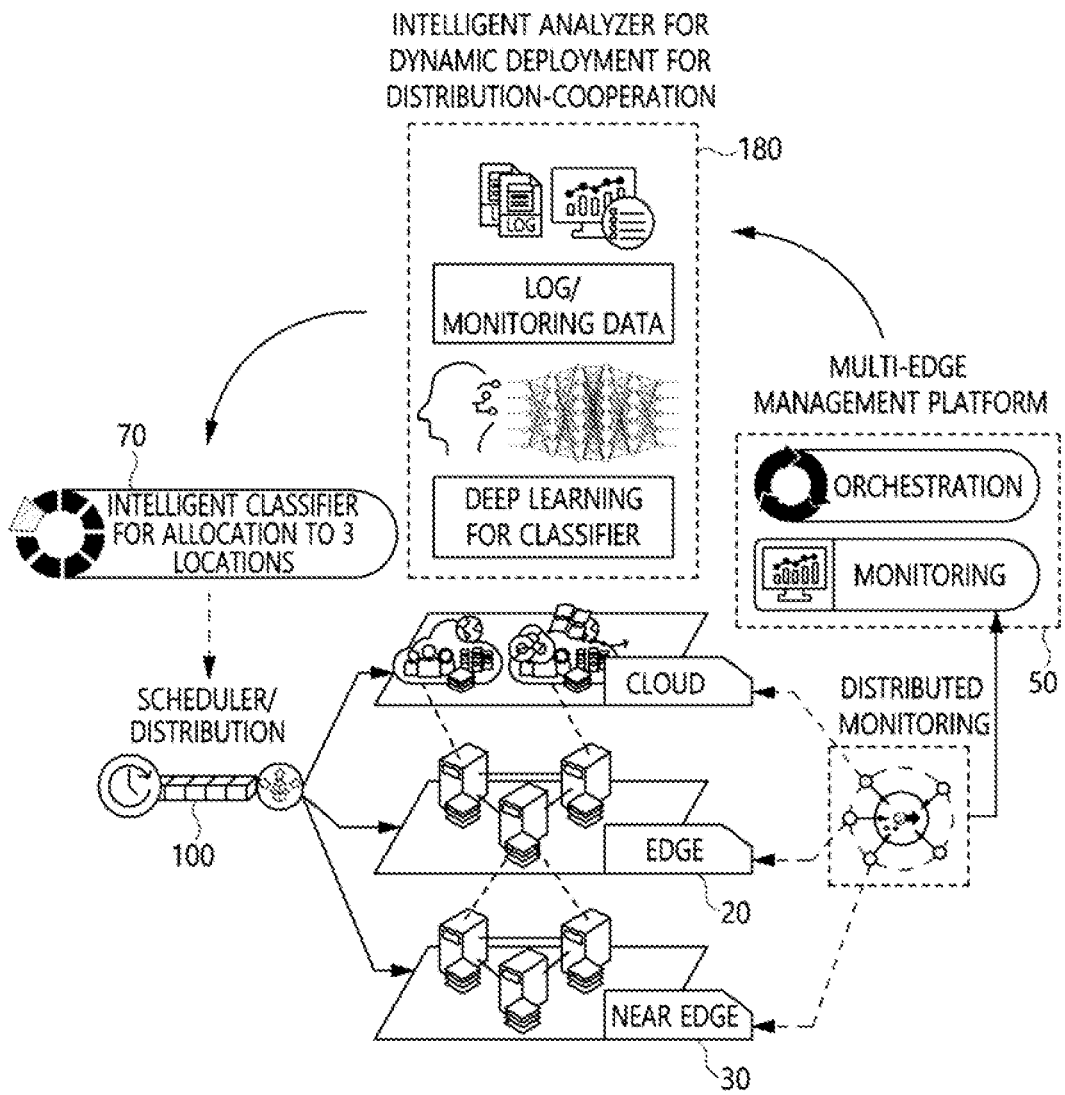
FIG. 17 is a view illustrating dynamic deployment for distributed cooperation of services based on an intelligent scheduler according to an embodiment of the present disclosure.

FIG. 17 is a view illustrating dynamic deployment for distributed cooperation of services based on an intelligent scheduler according to an embodiment of the present disclosure.

Referring to FIG. 17, schedulers of an intelligent scheduler 100 according to an embodiment of the present disclosure may be provided as intelligent schedulers, rather than fixed schedulers.

The intelligent scheduler 100 according to an embodiment of the present disclosure may further include an intelligent analyzer 180, which collects real-time monitoring data and logs for a cloud 11, an edge system 20, and a near edge system 30 and dynamically deploys various services to the intelligent scheduler by performing AI analysis, such as deep learning, on the collected data.

The intelligent analyzer 180 may need large amounts of history data when it derives an intelligent scheduler policy through AI training.

Here, although it cannot perform AI training immediately after construction of the edge service system, the intelligent analyzer 180 may train the edge scheduler policy after history data is collected for a certain period of time.

Figure 18:
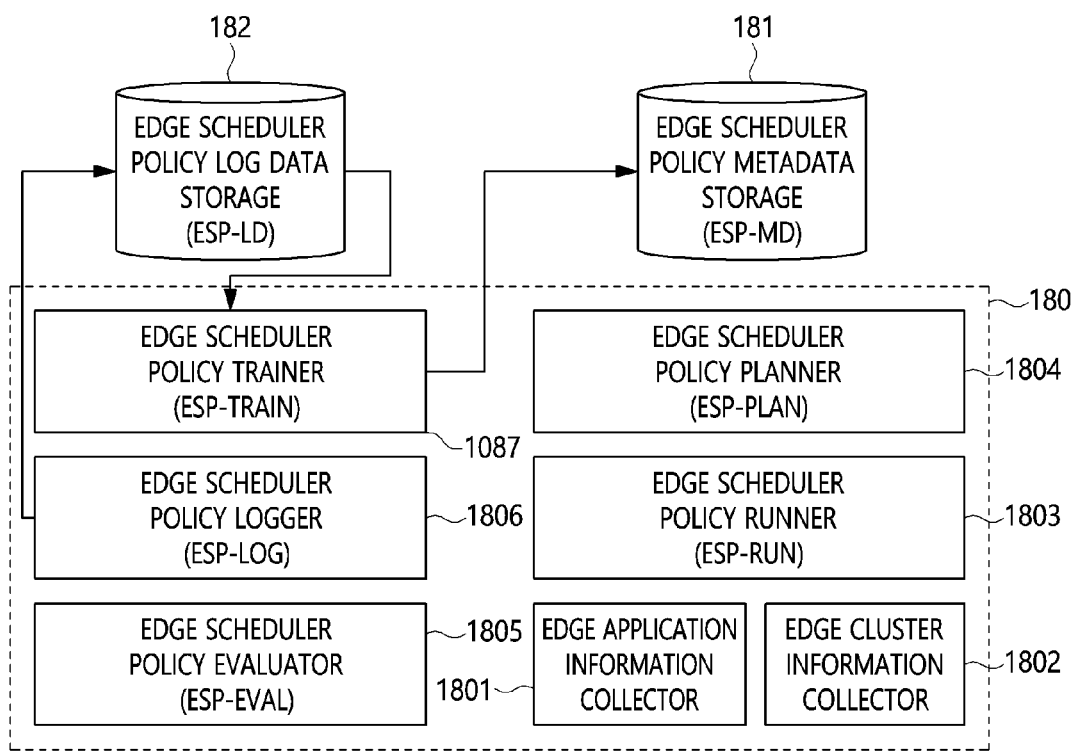
FIG. 18 is a block diagram illustrating an intelligent scheduler including an intelligent analyzer according to an embodiment of the present disclosure.

FIG. 18 is a block diagram illustrating an intelligent scheduler including an intelligent analyzer according to an embodiment of the present disclosure.

Referring to FIG. 18, it can be seen that an intelligent analyzer 180 included in an intelligent scheduler according to an embodiment of the present disclosure is illustrated in detail.

The intelligent analyzer 180 may include an edge application information collector 1801, an edge cluster information collector 1802, an edge scheduler policy runner 1803, an edge scheduler policy planner 1804, an edge scheduler policy evaluator 1805, an edge scheduler policy logger 1806, and an edge scheduler policy trainer 1807.

The intelligent analyzer 180 may store metadata and a scheduler policy log in edge scheduler policy metadata storage 181 and edge scheduler policy log data storage 182.

The edge scheduler policy metadata storage 181 may store the edge scheduler policy (ESP).

The edge scheduler policy log data storage 182 may store a result of application of the edge scheduler policy through the edge scheduler policy logger.

The edge application information collector 1801 may collect resource information such as response speed, actual CPU utilization, actual memory utilization, the state of use of other resources, and the like for each application running in the edge.

The edge cluster information collector 1802 may collect resource information such as actual CPU utilization, actual memory utilization, and the like in each of physical nodes constituting a cluster.

The edge scheduler policy runner 1803 applies various edge scheduler policies and evaluates the same depending on the degree of optimization, thereby running the best policy.

The edge scheduler policy planner 1804 may establish a policy based on the information collected by the edge application information collector 1801 and the edge cluster information collector 1802.

The edge scheduler policy evaluator 1805 may evaluate a scheduler policy depending on the degree of optimization after application of the edge scheduler policy.

The edge scheduler policy logger 1806 may store the run scheduler policy and the result thereof as logs.

The edge scheduler policy trainer 1807 may train a scheduler policy by fetching history data from the edge scheduler policy log data storage 182.

Figure 19:
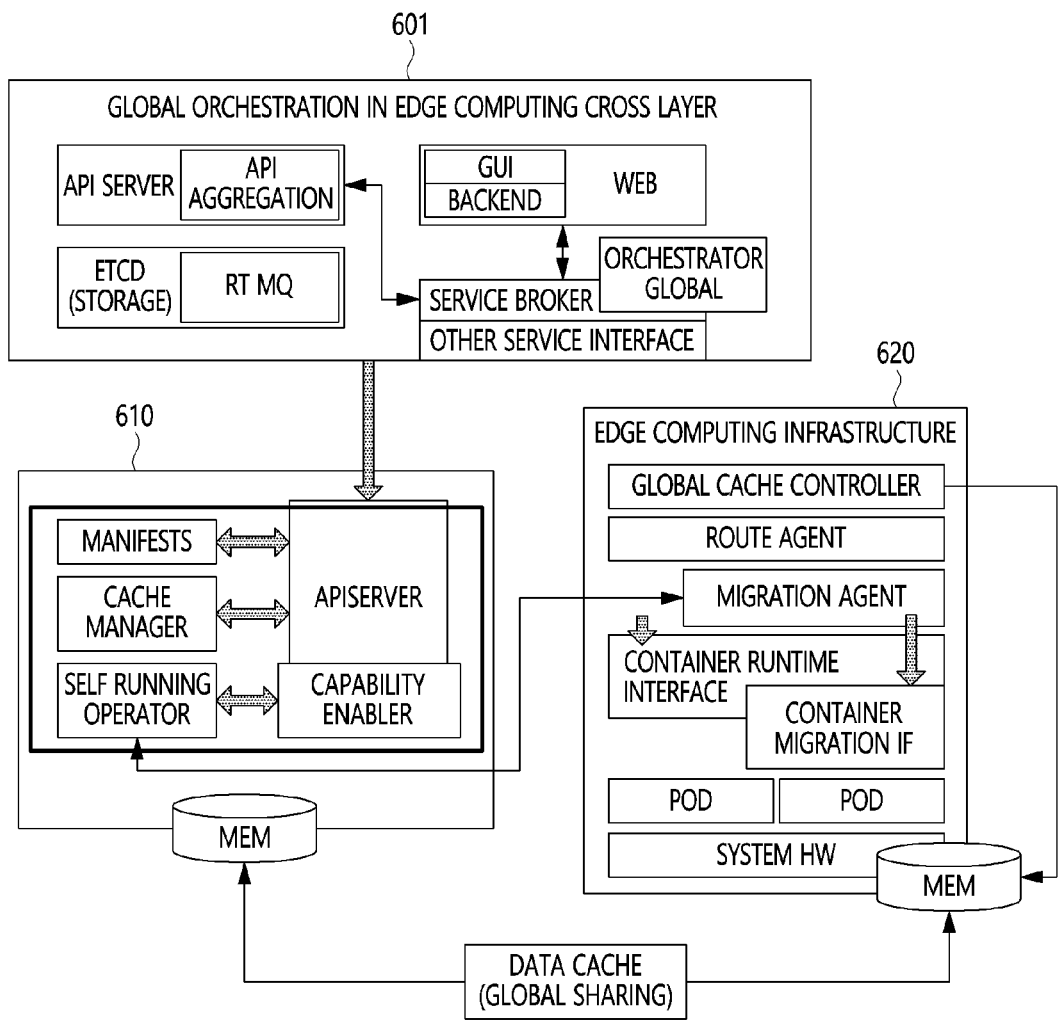
FIG. 19 is a view illustrating service migration for risk management in a distributed cloud system according to an embodiment of the present disclosure.

FIG. 19 is a view illustrating service migration for risk management in a distributed cloud system according to an embodiment of the present disclosure.

Referring to FIG. 19, a cloud service migration apparatus 610 of a distributed cloud system according to an embodiment of the present disclosure may stably capture a container state in a transferrable form in real time.

A pod may be a single container or may be configured with multiple containers. The state of each container may be transferred from a source pod to a target pod.

The cloud service migration apparatus 610 may write and integrate a container-based API as a container migration interface by using Checkpoint Restore in Userspace (CRIU).

The CRIU is a software tool for the Linux OS. Using this tool, a running application may be stopped and checkpointed as a collection of files in permanent storage.

Basically, in the container-based platform K8s, a pod is adjusted by a process of a node 620.

Therefore, the cloud service migration apparatus 610 may allocate a pod to the node 620, and a replication controller may create, delete, or update a pod by communicating with a suitable node.

The node 620 may perform control tasks for maintaining and managing a pod and creating a container through a migration agent.

The cloud service migration apparatus 610 may perform migration through K8S CustomResourceDefinitions (CRD) in which a migration capability is predefined (EC capability Enabler-Migration Manager).

CRD is connected with the management function of K8S, thereby taking charge of a control function for managing migration.

As illustrated in FIG. 19, the cloud service migration apparatus 610 of the distributed cloud system may call an offloading controller (EC Capability operation-Migration agent) residing in the node 620 through an API of K8S.

If a container checkpoint image of a pod is present, a mechanism for transferring this data between nodes is required. Currently, the only example of data communication between nodes in Kubernetes allows only a redeployment task through transfer of configuration data such as a pod template. Also, the nodes 620 do not communicate with each other in the orchestration layer. This acts an obstacle to data and service migration for a real-time seamless service. Therefore, the cloud service migration apparatus 610 uses a mechanism of shared storage in order to reduce data transfer between nodes and between pods, and uses a network connection function at the orchestration layer.

For the service migration using the shared storage, the cloud service migration apparatus 610 may check a pod state of the target node 620 of migration on the edge cloud through the offloading controller and extract the pod state.

Here, the cloud service migration apparatus 610 may check the states of all containers in consideration of the sequence of dependencies between the containers in the source pod/node.

Here, the cloud service migration apparatus 610 may check a network connection with a remote target node using a network monitoring function.

Here, the cloud service migration apparatus 610 may dump an image file of the live state of a container using a checkpoint creation call function.

The cloud service migration apparatus 610 may provide the checkpoint creation call function.

Here, the cloud service migration apparatus 610 may create a snapshot by dumping the image file of the live states of the containers included in the pod.

The cloud service migration apparatus 610 may provide a function for transferring a checkpoint image and a pod state.

Here, the cloud service migration apparatus 610 may transfer the snapshot to a checkpoint repository corresponding to the shared storage of the edge cloud. The checkpoint repository may provide an additional management function for easily searching for and processing a file (connected with a data management and deployment management function).

The cloud service migration apparatus 610 may check a network connection with the remote target node.

The cloud service migration apparatus 610 may provide a checkpoint state check and monitoring function.

Here, the cloud service migration apparatus 610 may monitor state information of the checkpoint repository.

The cloud service migration apparatus 610 may provide a checkpoint time restore call function.

Here, the cloud service migration apparatus 610 may call the restore function of each container in consideration of the sequence of dependencies between containers based on the snapshot and the container state file.

Here, for migration of an edge computing system (including a distributed cloud environment), the cloud service migration apparatus 610 may check the state of an application in an edge, check a network of a node to which migration is possible, store the current state of the application as a snapshot image in the edge, and perform image restoration at the restoration location.

Each cloud may be configured as a cluster, and a high-speed connection may include a private network connection method for tunneling in virtualization or a route bypass mechanism through a network proxy.

The cloud service migration apparatus 610 may connect the IP address of the node from which the snapshot is extracted and the IP address of the node to which the snapshot is to be migrated through a predefined proxy service.

Figure 20:
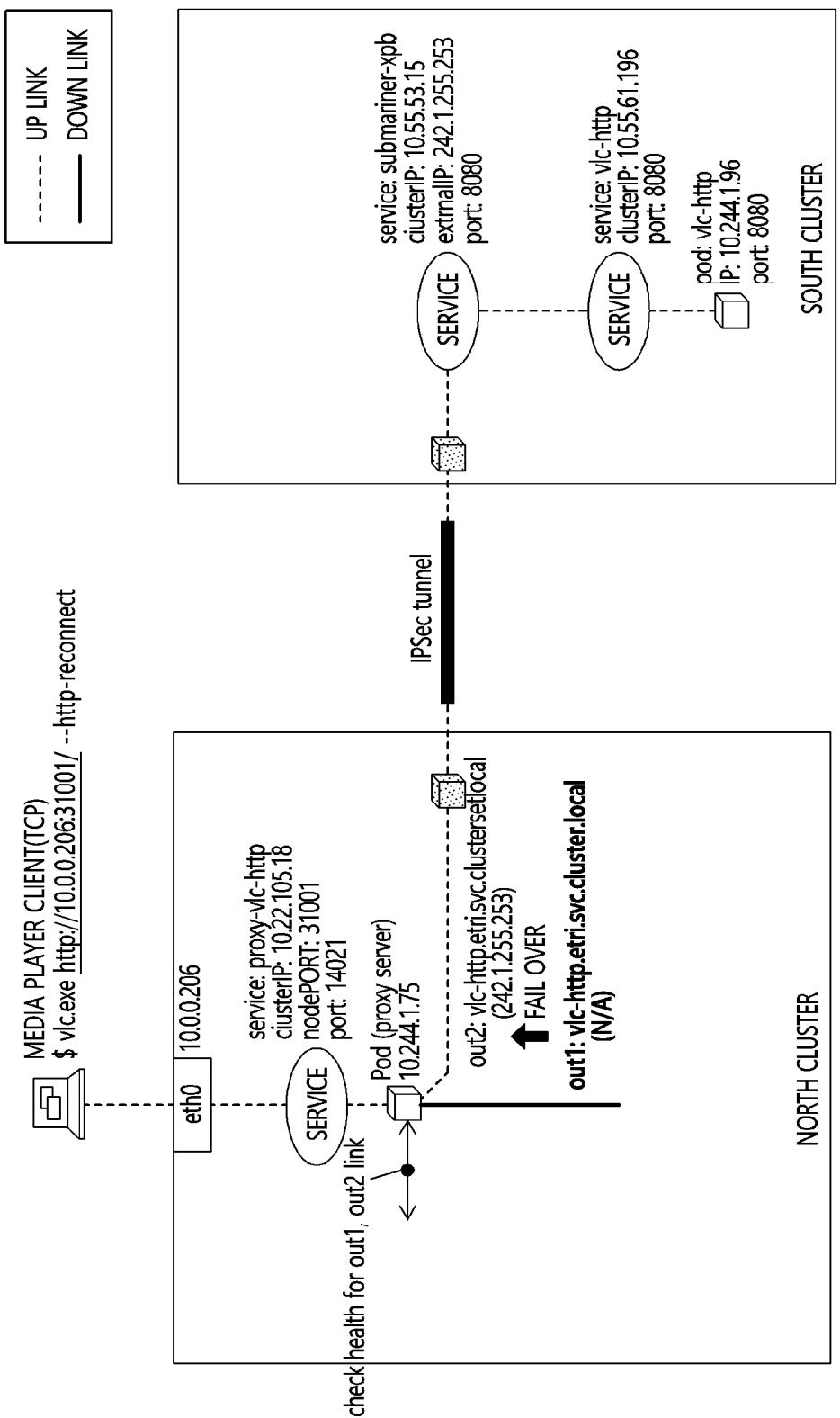
FIGS. 20 to 22 are views illustrating a seamless service in the event of service transfer of a distributed cloud system according to an embodiment of the present disclosure.
Figure 21:
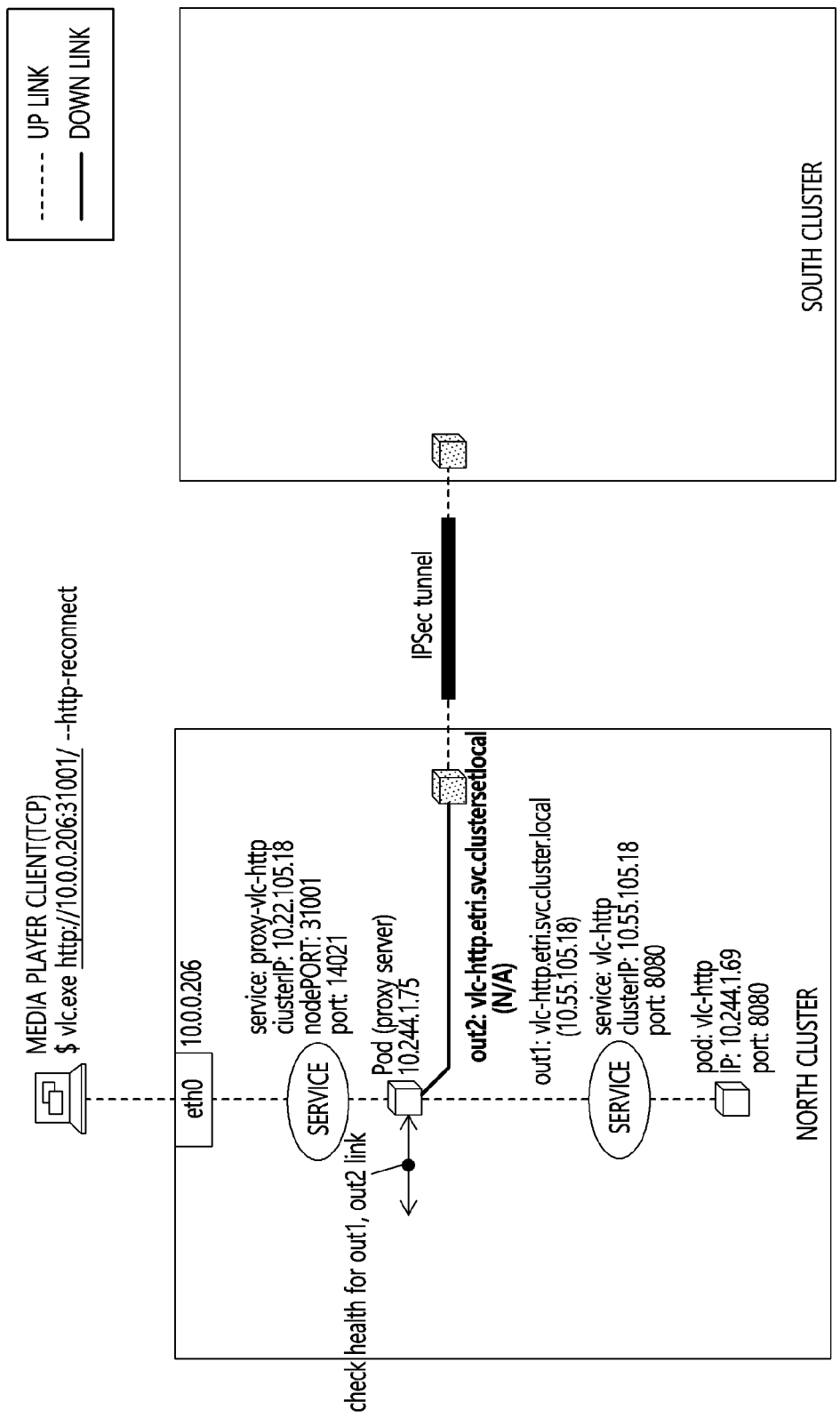
Figure 22:
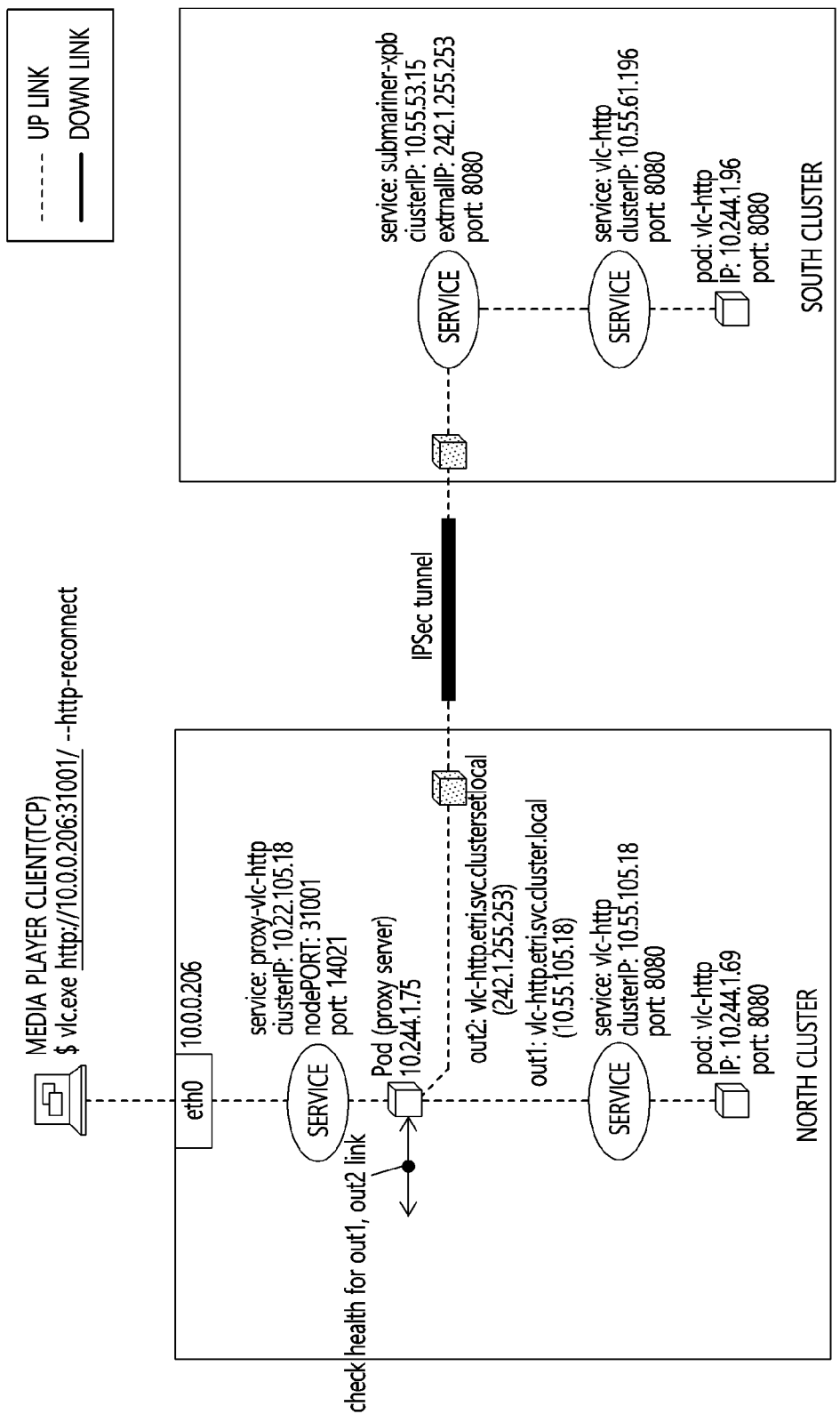

FIGS. 20 to 22 are views illustrating a seamless service in the event of service transfer in a distributed cloud system according to an embodiment of the present disclosure.

Referring to FIG. 20, a data-processing method of a distributed cloud system according to an embodiment of the present disclosure may perform migration of an application and data depending on the movement of a user. Particularly, in the distributed cloud system such as edge computing, an application may be deployed and provided in a place close to a user as a capability for service cooperation. Accordingly, not a single application but applications running on multiple servers have to be migrated at the same time. Here, a delay may occur or a service may be interrupted due to the transfer of the service in edge computing.

The distributed cloud system may perform failover in order to prevent such service interruption, and may perform load balancing when it deploys the services in multiple clusters.

As illustrated in FIG. 20, the distributed cloud system may provide network connectivity between heterogeneous clusters through tunneling between multiple clusters (e.g., IPsec).

The distributed cloud system may export a service from cluster 1 to cluster 2 (service export), and a pod (application) distributed to cluster 1 may access the service through a corresponding network.

A route agent updates the domain information (the domain name and IP address) of the corresponding service in a registry by accessing the DNS server of cluster 2, to which the service is exported, by supporting service discovery, and all of the applications distributed to cluster 2 may acquire the IP address for accessing the service exported from cluster 1 by querying cluster 2.

Therefore, service export may enable services in different clusters to be acquired through the DNS server of each of the clusters. Service export indicates announcing the service access route between different clusters, and an exported service may be performed by route agents.

Here, the service exposed to other clusters may be seamlessly connected with a service that is located in another cluster due to migration or load balancing. Therefore, the distributed cloud system may maintain the connection with the service without interruption by using a proxy server for edge computing and HA or using load balancing.

The access IP addresses of most clusters are not typically exposed outside due to a security problem. Therefore, the distributed cloud system may write an access IP address as a proxy server and connect the same to the internal connection IP address, so that it is easily distributed to a place in which the service is required. An HA Proxy (high availability proxy) supports a health check for a link and failover by interworking with the DNS server, and may also support an access function for service transfer.

Here, the HA Proxy may periodically check a network connection with the edge computer system.

Here, when the network connection with the edge computer system is disconnected, the distributed cloud system performs failover through a new connection with an additional edge computer system using service exposure, thereby restoring a seamless network connection.

Here, the distributed cloud system may store the current state of the application as a snapshot image.

Here, the distributed cloud system may migrate the snapshot image to shared storage.

Here, when the snapshot image is migrated, the distributed cloud system may restore the snapshot image.

Here, for the restored network connection, the HA Proxy may record at least one of the service port thereof, or the address thereof, or a combination of the service port and the address in the additional edge computer system.

Here, when the network connection with the edge computer system is disconnected, the HA Proxy may automatically access the additional edge computer system that is announced in advance.

Referring to FIGS. 20 to 22, a process of performing migration for a video application service in a seamless service process of a distributed cloud system according to an embodiment of the present disclosure is illustrated.

Referring to FIG. 20, it can be seen that an application and service for providing media (vlc-http) are distributed to a North cluster.

Here, it can be seen that a TCP-based proxy pod and service capable of supporting failover are distributed to the North cluster (proxy-vlc-http).

The proxy service may support a client connection (frontend) from a client outside the cluster through a node port (e.g., NodePort 31001), and may support a vlc-http service connection (backend) through a domain name.

The North cluster periodically checks the state of a domain access link of vlc-http, thereby supporting automatic failover from a downlink to an uplink.

A client may access the vlc-http server and play video streaming using an application client.

Referring to FIG. 21, it can be seen that a real-time container checkpoint is created for transfer of the service of the vlc-http application to a South cluster and stored in the connected shared storage and that restoration is performed in the South cluster.

After restoration is performed in the South cluster, when the service is exported, a link to the vlc-http application and service is enabled in the North cluster.

Referring to FIG. 22, it can be seen that, when transfer to the South cluster is completed, the application and the service therefor are deleted from the North cluster.

When the service is deleted from the North cluster, the domain link of the local cluster (North cluster) disappears simultaneously therewith, the link to the South cluster is automatically enabled through the running proxy server, and the service may be continuously provided by connecting to the link.

Because the distributed cloud system does not support service export for a service connection when the service connection is not exposed due to security, it may provide a proxy for exposing an application IP address to the outside of the cluster.

The distributed cloud system may retrieve a service name by querying the DNS (the domain name server) about a proxy for exposing the application IP address to the outside of the cluster.

Simultaneously, the distributed cloud system periodically checks a connection state of the IP address mapped to the service domain name, thereby providing the network connection to the enabled service when the link is down.

Figure 23:
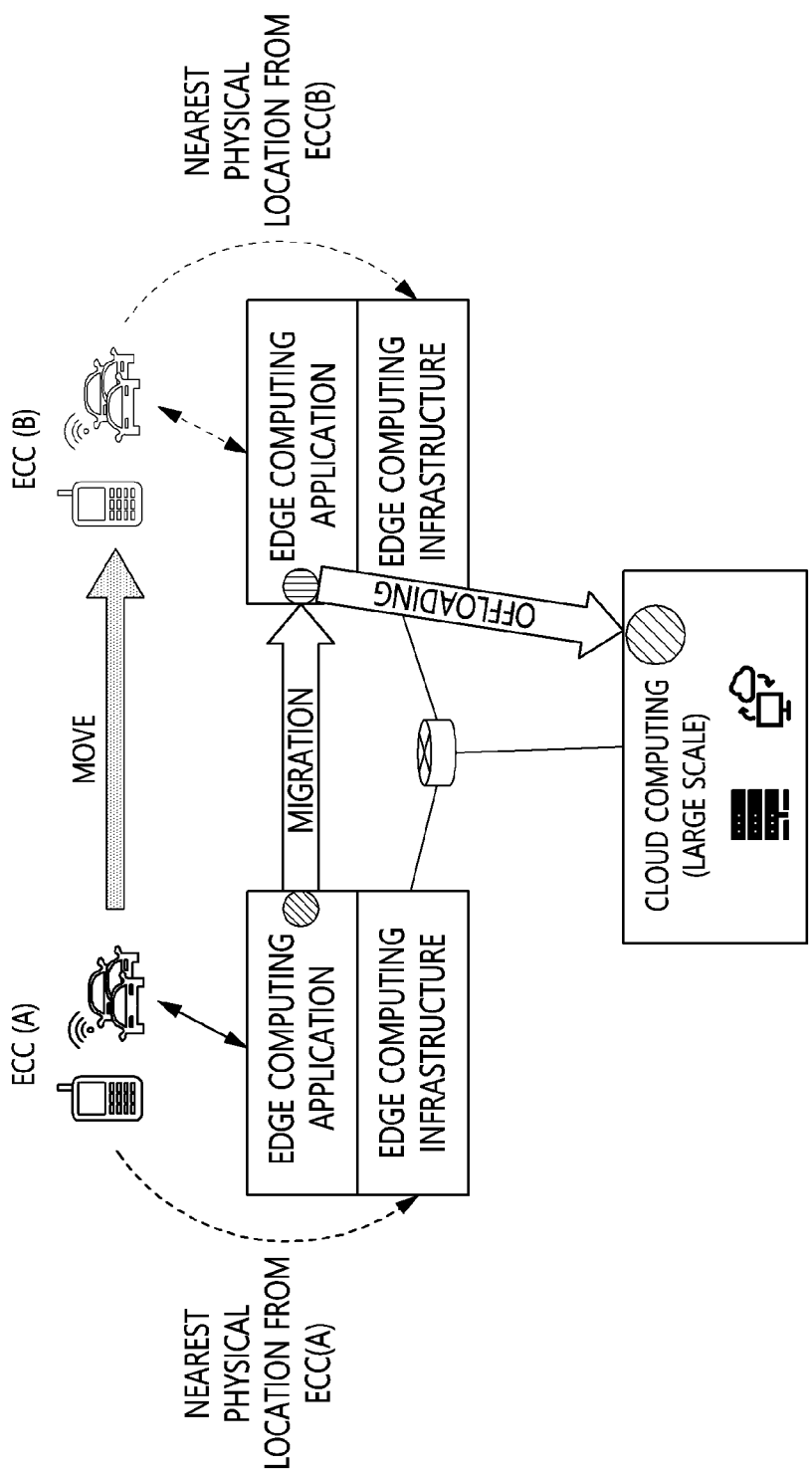
FIG. 23 is a view illustrating edge computing cooperation according to an embodiment of the present disclosure.

FIG. 23 is a view illustrating edge computing cooperation according to an embodiment of the present disclosure.

Referring to FIG. 23, edge computing may be configured such that an edge computing infrastructure including cloud computing and a data center at different locations are connected over a network and edge computing infrastructures are connected with each other. Accordingly, edge computing may include a capability of maximizing the efficiency of distributed infrastructures through offloading and migration of workloads of an edge computing application.

The cooperation capability may include offloading workloads between cloud computing and a data center including an edge computing infrastructure and migration between edge computing infrastructures.

Migration includes migration of an edge computing application and relevant data, and the state of the edge computing application is captured in real time in a transferable format, such as a snapshot, whereby the state of the running edge computing application may be stored, maintained, and managed.

Offloading may transfer a resource-intensive computational task to a hardware accelerator of a cloud data center or a special processor, such as an external device, through resource load monitoring and network monitoring by a global scheduler.

For offloading and migration of workloads, migrating and offloading an edge computing application, which is to be executed in each edge computing infrastructure, may be performed by a capability enabler (software), which provides management software for migration, and a migration execution agent for providing an edge computing service to an ECP. Also, in order to enable migration of an edge computing application and large amounts of data, edge computing may provide a storage interface for data migration and global shared storage for a high speed network between edge computing infrastructures.

For EC cooperation, a network connection between EC appliances is required.

Migration includes processes of migrating an application and migrating relevant data, and a stable and efficient method for capturing the state of the application in a transferable format in real time and storing a snapshot for maintaining the state of the running application is required. Offloading may include transferring a resource-intensive computational task to a special processor appliance such as a hardware accelerator or an external device such as a cloud data center through resource load monitoring and network monitoring by a global scheduler.

For offloading and migration of workloads, migrating and offloading an EC application, which is to be executed in each EC appliance, may be led by management software for migration and a capability enabler (software), which provides an agent for migration in the EC appliance.

Also, in order to migrate the EC application and large amounts of data, EC may provide a storage interface for facilitating data transfer and global shard storage for a high-speed network between EC appliances.

EC may provide a capability enabler.

The capability enabler may be software or hardware implemented for performing the EC capability.

EC may distribute a capability enabler embedded in a container or a virtual machine in order to quickly provide the EC capability when using virtual technology.

EC may provide cooperation between EC appliances in order to maximize the efficiency of distributed resources.

The cooperation of EC may include workload offloading and service migration.

Migration may include processes of migrating an application and migrating relevant data.

Application migration may include a control process that includes checking the state of an EC application, checking a target by an EC device, storing the current state of the EC application as a snapshot image, and restoring the image in the target.

In the case of migration by the EC device having a remote and separate cluster, migration may comprise storing and restoring a snapshot of the state of an actually running application using shared or federated storage having a high-speed network (e.g., a kernel bypass network).

Offloading may include transferring a resource-intensive computational task to another EC device such as a hardware accelerator or an external device such as a cloud data center through migration or replication.

Figure 24:
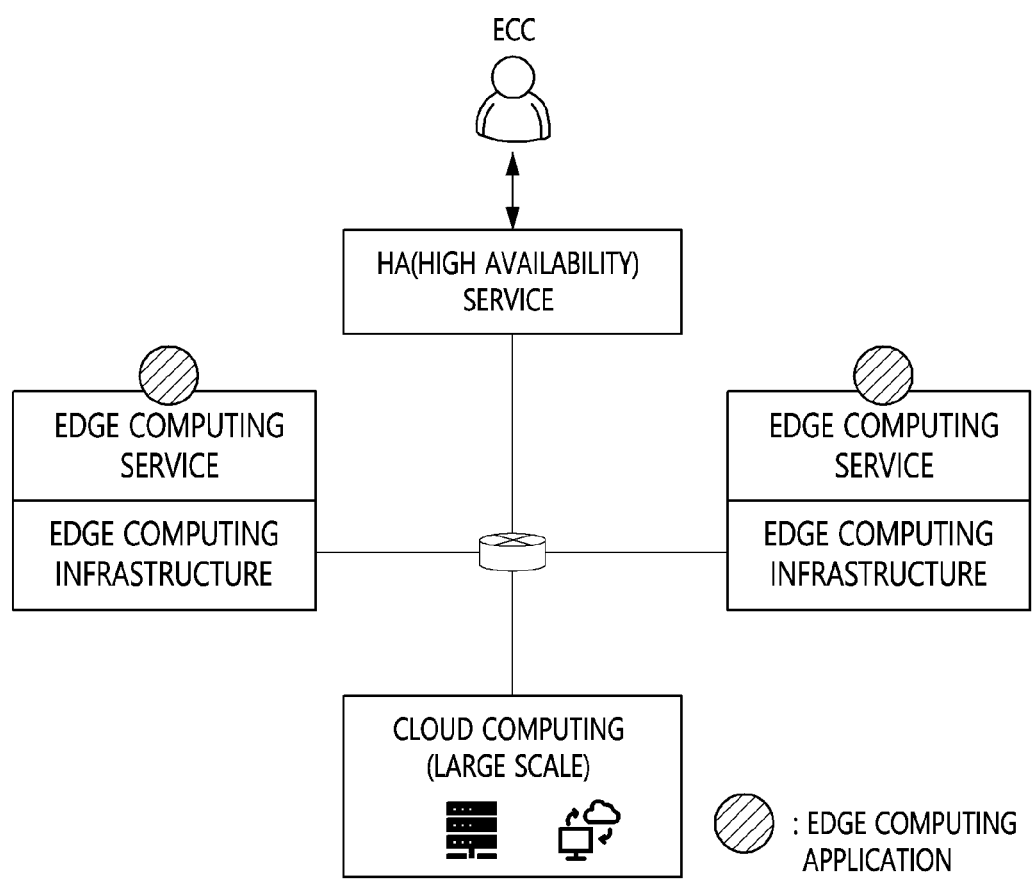
FIG. 24 is a view illustrating network connectivity of edge computing according to an embodiment of the present disclosure.

FIG. 24 is a view illustrating network connectivity of edge computing according to an embodiment of the present disclosure.

Referring to FIG. 24, this use case illustrates an example of network connectivity indicating a network connection that enables a user to be provided with a continuous service in edge computing.

The network connectivity, which is presented as one of the capabilities of edge computing, may enable a continuous service depending on the movement of a user and application in edge computing.

As illustrated in FIG. 24, each edge computing infrastructure and a data center, using cloud computing, may individually operate in a remote manner by using different IP addresses.

The edge computing infrastructure may be connected with a network in response to a request by a user for user proximity and data affinity.

When the edge computing infrastructure is already connected with a network, a service may be used through the connected network. Otherwise, a network connection may be established only through a public interface (an IP address or a URL) of the edge computing infrastructure.

Also, when the edge computing infrastructure is configured with a cluster or data center including cloud computing, an interface for accessing an application is protected and is not exposed outside.

Accordingly, a network connection may use a network based on secure tunneling using IPsec or basic routing for a gateway between network layers and internal recognition of a cluster, such as a routing rule based on a network proxy using the application layer of the TCP protocol.

The network connection capability may provide failover for an edge computing application in order to prevent service interruption and to perform load balancing when a service is distributed.

The service information (an IP address, a domain name, or a URL) illustrated in FIG. 24 may be exposed to the edge computing infrastructure.

Here, edge computing may support a seamless service in the event of transfer of a service between two clusters by using a high availability (HA) proxy server or a load balancer.

The HA proxy server or the load balancer may check the connection in real time, and may perform failover through a new connection by using service exposure when the connection is disconnected. Edge computing may provide a smooth network connection between an ECC and an edge computing application.

Because the edge computing infrastructure (including cloud computing) has to support a network connection requested by a newly created edge computing service or an ECC, a gateway, a router, and service exposure for a network connection are implemented using hardware or software resources in an ECN, and the edge computing service may provide the network connection in the edge computing infrastructure.

Figure 25:
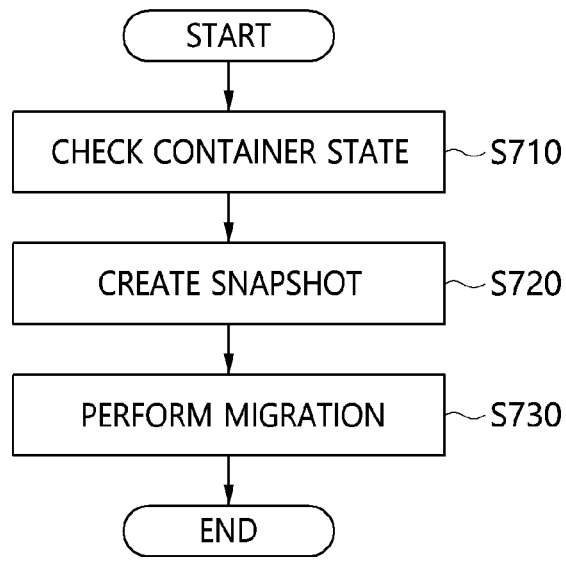
FIG. 25 is a flowchart illustrating a cloud service migration method of a distributed cloud system according to an embodiment of the present disclosure.

FIG. 25 is a flowchart illustrating a cloud service migration method of a distributed cloud system according to an embodiment of the present disclosure.

Referring to FIG. 25, in the cloud service migration method included in the data-processing method of a distributed cloud system according to an embodiment of the present disclosure, first, the state of a container may be checked at step S710.

That is, at step S710, a cloud service migration apparatus 610 may check the state of a pod of a target node 620 of migration on an edge cloud through an offloading controller and extract the state of the pod.

Here, at step S710, the distributed cloud system receives a user request for the edge cloud, whereby the distributed cloud system may be controlled.

Here, the distributed cloud system may include a core cloud including large-scale resources, the edge cloud, and a local cloud having medium-scale resources between the core cloud and the edge cloud.

Here, at step S710, the distributed cloud system may process a task in response to the user request, distribute the same based on a waiting queue, and collect the result of the processed task.

The pod may be a single container, or may be configured with multiple containers. The state of each container may be transferred from a source pod to a target pod.

Here, at step S710, the states of all containers may be checked in consideration of the sequence of dependencies between the containers in the source pod/node.

In the cloud service migration method according to an embodiment of the present disclosure, a snapshot may be created at step S720.

That is, at step S720, a snapshot may be created by dumping an image file of the live state of the container.

Here, at step S720, the distributed cloud system may perform instructions that include providing data processed in response to the user request.

Here, the instructions may perform a management function when the distributed cloud system fails.

The management function may include control of data transfer between edge clouds including the above-mentioned edge cloud.

The control of the transfer may comprise checking the state of the edge cloud and storing the current state of the snapshot image.

Also, in the cloud service migration method according to an embodiment of the present disclosure, migration may be performed at step S730.

That is, at step S730, the snapshot may be transferred to a checkpoint repository. The checkpoint repository may provide an additional management function for easily searching for and processing a file (connected with a data management and deployment management function).

Here, at step S730, the distributed cloud system may reduce the transfer of the snapshot between the edge clouds by using memory.

Here, at step S730, the distributed cloud system may perform migration through which the snapshot image is stored in the checkpoint repository corresponding to the shared storage of the edge cloud.

Here, at step S730, a network connection with a remote target node may be checked.

Here, at step S730, migration may be performed through K8S CustomResourceDefinitions (CRD) in which a migration capability is predefined (EC capability Enabler-Migration Manager).

Here, at step S730, the checkpoint image and the state of the pod may be transferred.

Here, at step S730, the state information of the checkpoint repository may be monitored.

Here, at step S730, a checkpoint time restore call function may be provided.

Here, at step S730, the restore function of each container may be called in consideration of the sequence of dependencies based on the snapshot and container state file stored in the checkpoint repository.

Here, at step S730, the IP address of the node from which the snapshot is extracted and the IP address of the node to which the snapshot is to be migrated may be connected through a predefined proxy service.

Figure 26:
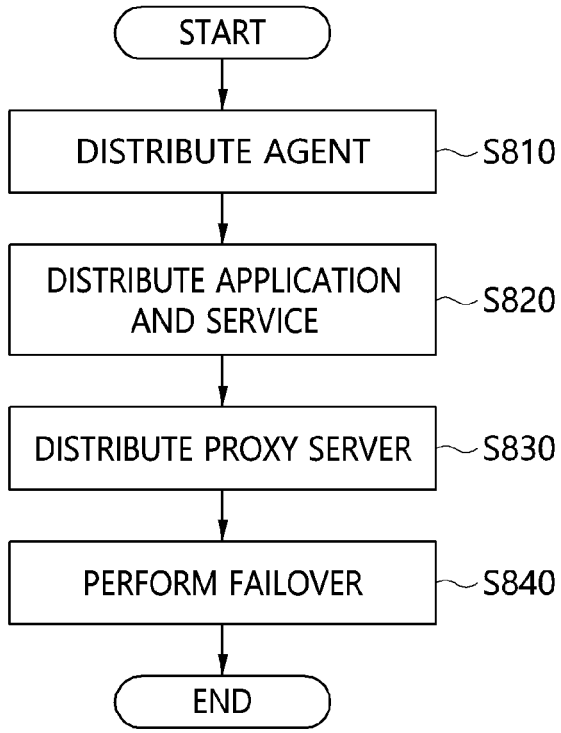
FIG. 26 is a flowchart illustrating a seamless service method of a distributed cloud system according to an embodiment of the present disclosure.

FIG. 26 is a flowchart illustrating a seamless service method of a distributed cloud system according to an embodiment of the present disclosure.

Referring to FIG. 26, in the seamless service method included in the data-processing method of a distributed cloud system according to an embodiment of the present disclosure, first, an agent may be distributed at step S810.

That is, at step S810, a network connection between heterogeneous clusters may be established through tunneling (e.g., IPsec) between the multiple clusters.

Here, at step S810, after the connection is established, an agent (route agent) for the connection between the clusters may be distributed.

Also, in the seamless service method of the distributed cloud system according to an embodiment of the present disclosure, an application and a service may be distributed at step S820.

That is, at step S820, an application and a service may be created and distributed to the cluster.

Also, in the seamless service method of the distributed cloud system according to an embodiment of the present disclosure, a proxy server may be distributed at step S830.

That is, at step S830, an HA proxy server supporting failover and a service therefor may be created and distributed.

Here, the distributed proxy server may provide a user service by establishing a connection to an IP address that is not exposed for security, and in the cluster, a connection to each node may be established through a domain name.

Also, in the seamless service method of the distributed cloud system according to an embodiment of the present disclosure, failover may be performed at step S840.

That is, at step S840, after the connection is established, the connection state for domain access may be periodically checked.

Here, at step S840, when the connection is disconnected, failover may be performed through a new connection that is registered in advance.

Figure 27:
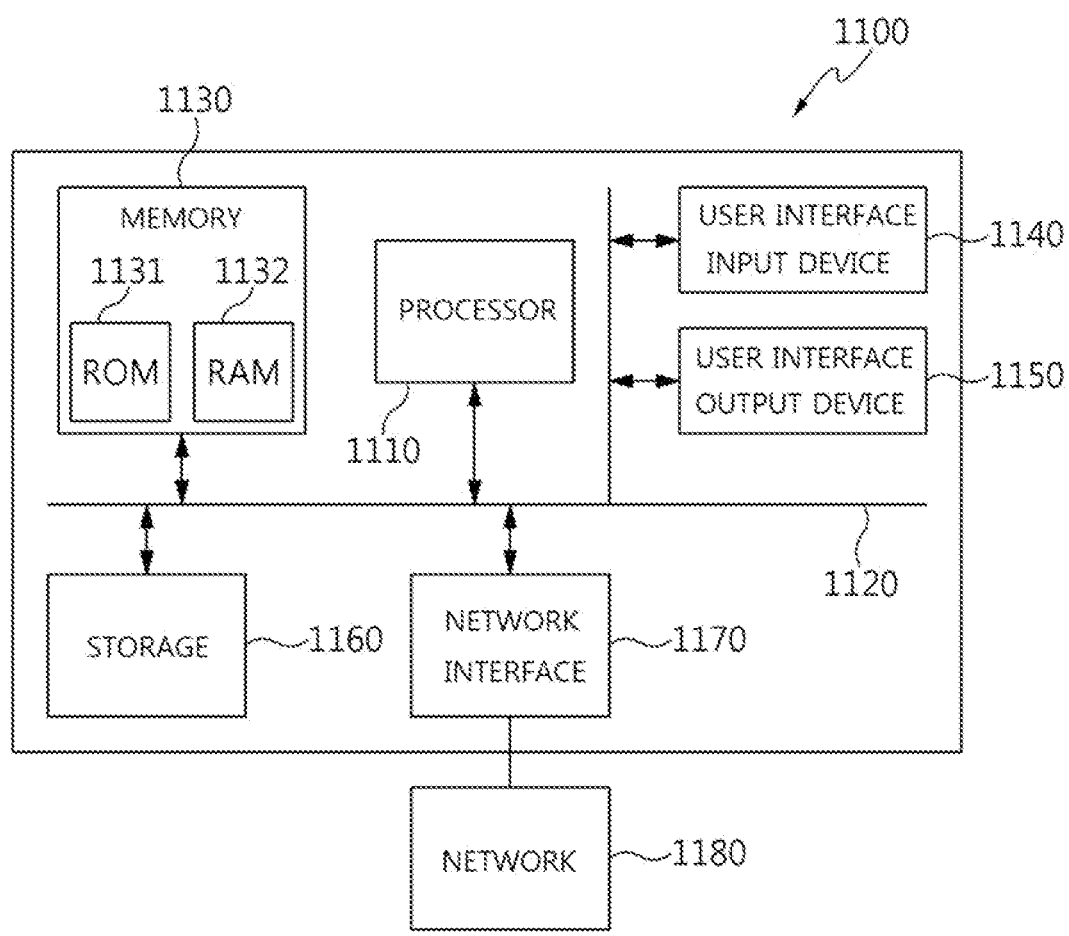
FIG. 27 is a view illustrating a computer system according to an embodiment of the present disclosure.

FIG. 27 is a block diagram illustrating a computer system according to an embodiment of the present disclosure.

Referring to FIG. 27, the distributed cloud system and the storage medium according to an embodiment of the present disclosure may be implemented in a computer system 1100 including a computer-readable recording medium. As illustrated in FIG. 27, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The distributed cloud system according to an embodiment includes one or more processors 1110 and memory 1130 for storing at least one program executed by the one or more processors 1110, and the processor 1110 receives a user request for an edge cloud and control the distributed cloud system. Here, the distributed cloud system includes a core cloud including large-scale resources, the edge cloud, and a local cloud including medium-scale resources between the core cloud and the edge cloud. The processor performs processes for processing a task in response to the user request, distributing the same based on a waiting queue, collecting a result of the processed task, and providing data processed in response to the user request. Here, when the distributed cloud system fails, the processor performs a management function.

Here, the management function includes control of data transfer between edge clouds including the edge cloud, and the transfer control may comprise checking the state of the edge cloud, storing the current state of a snapshot image, and reducing the transfer of the snapshot between the edge clouds by using the memory.

Here, the processor may perform migration through which the snapshot image is stored in a checkpoint repository corresponding to the shared storage of the edge cloud.

Also, the processor may execute an application of an edge computer system, which is requested by an external device, create a snapshot image of the application, store the created snapshot image in the storage, and transfer the stored image when migration is performed.

Here, the application may maintain a seamless service connection with the external device.

Here, the current state of the application may be stored as the snapshot image.

Here, when the snapshot image is migrated, the snapshot image may be restored.

Also, the processor 1110 may execute an application of an edge computer system, which is requested by an external device, make a high availability proxy periodically check a network connection with the edge computer system, and restore a seamless network connection by performing failover through a new connection with an additional edge computer system using service exposure when the network connection with the edge computer system is disconnected.

Here, the application may maintain a seamless service connection with the external device.

Here, the processor 1110 may store the current state of the application as the snapshot image.

Here, the processor 1110 may migrate the snapshot image to shared storage.

Here, the processor 1110 may restore the snapshot image when the snapshot image is migrated.

Here, the high availability proxy may record at least one of the service port thereof, or the address thereof, or a combination of the service port and the address in the additional edge computer system for the restored network connection.

Here, the high availability proxy may automatically access the additional edge computer system, which is announced in advance, when the network connection with the edge computer system is disconnected.

Also, the storage 1160 that is a storage medium for storing a program executable by a computer according to an embodiment of the present disclosure receives a user request for an edge cloud and controls a distributed cloud system. Here, the distributed cloud system includes a core cloud including large-scale resources, the edge cloud, and a local cloud including medium-scale resources between the core cloud and the edge cloud and performs instructions that include processing a task in response to the user request, distributing the same based on a waiting queue, collecting a result of the processed task, and providing data processed in response to the user request. Here, the instructions include performing a management function when the distributed cloud system fails.

Here, the management function includes control of data transfer between edge clouds including the edge cloud, and the transfer control may comprise checking the state of the edge cloud, storing the current state of a snapshot image, and reducing the transfer of the snapshot between the edge clouds by using memory.

Here, the program may perform migration through which the snapshot image is stored in a checkpoint repository corresponding to the shared storage of the edge cloud.

Also, the storage 1160 may execute an application of the edge computer system, requested by a user device, create a snapshot image of the application, store the created snapshot image, and transfer the stored image when migration is performed.

Also, the storage 1160 executes the application of the edge computer system, requested by the user device, makes a high availability proxy periodically check a network connection with the edge computer system, and restores a seamless network connection by performing failover through a new connection with an additional edge computer system using service exposure when the network connection with the edge computer system is disconnected.

The distributed cloud system according to an embodiment of the present disclosure may smoothly support various distributed computing environments for services of edge computing.

The distributed cloud system according to an embodiment of the present disclosure may provide a high-performance architecture for efficient cooperation between clusters.

The distributed cloud system according to an embodiment of the present disclosure may configure a high-performance container and a global cache for data connection between containers by using a memory-based storage device for improving efficiency of the containers.

The distributed cloud system according to an embodiment of the present disclosure may provide a high-speed network connection between clusters for a cooperation service.

The distributed cloud system according to an embodiment of the present disclosure may configure a high-speed network based on tunneling for a cooperation service between clusters.

The distributed cloud system according to an embodiment of the present disclosure may provide a management technique for cooperation between clusters over a connected network.

The distributed cloud system according to an embodiment of the present disclosure provides a system structure and an intelligent scheduling method for the proposed optimization of vertical and horizontal cooperation between a cloud and an edge, whereby an application developer may embody application of edge-platform-based distributed cooperation, which connects vertical cooperation between an edge and an edge terminal and horizontal cooperation between an edge and a cloud edge, at a system level.

The distributed cloud system according to an embodiment of the present disclosure provides a service transfer method and a migration method for deploying a service near a user over distributed clusters.

The distributed cloud system according to an embodiment of the present disclosure may provide service transfer through a service proxy server and provide a function such that a user is able to use the service without interruption when the user is moving.

The distributed cloud system according to an embodiment of the present disclosure may solve memory constraints by solving a problem of a limit on the size of memory using an expandable storage structure configured in the present disclosure, and may solve a problem caused due to volatile characteristics by using a backup/restore function through a real-time snapshot backup environment.

The distributed cloud system according to an embodiment of the present disclosure enables a system to be easily configured and used, because a module is included in the Linux by being merged with a kernel.

The distributed cloud system according to an embodiment of the present disclosure provides a user-level network tunneling connection between multiple clusters at the level of L3 and applies a tunneling mechanism using a kernel-bypass network stack in order to realize a high-speed connection in the network of the multiple clusters, thereby configuring a high-speed network.

The distributed cloud system according to an embodiment of the present disclosure may provide an optimized intelligent scheduler function for cooperation.

The distributed cloud system according to an embodiment of the present disclosure may provide scheduling suitable for a low-latency service.

The distributed cloud system according to an embodiment of the present disclosure may provide integrated cooperation including horizontal cooperation and vertical cooperation.

The distributed cloud system according to an embodiment of the present disclosure may apply cooperation at a system level.

The distributed cloud system according to an embodiment of the present disclosure may provide cooperation based on intelligent offloading.

The distributed cloud system according to an embodiment of the present disclosure may provide a seamless service connection.

The distributed cloud system according to an embodiment of the present disclosure may provide integrated distributed processing including a cloud, an edge, and a near edge.

The distributed cloud system according to an embodiment of the present disclosure may establish an efficient intelligent scheduler policy based on log or statistical information.

The distributed cloud system according to an embodiment of the present disclosure may provide migration between clusters using a shared storage cache function through a high-performance computing environment.

The present disclosure may provide service migration for efficient cooperation between clusters.

Also, the present disclosure may provide a high-speed network connection between multiple clusters for a cooperation service.

Also, the present disclosure may provide optimal management for cooperation between clusters on a connected network.

As described above, the distributed cloud system and the data-processing method and storage medium thereof according to the present disclosure are not limitedly applied to the configurations and operations of the above-described embodiments, but all or some of the embodiments may be selectively combined and configured, so the embodiments may be modified in various ways.

What is claimed is:

1. A data-processing method of a distributed cloud system, comprising:
executing an application of an edge computer system, which is requested by an edge computing customer device;
periodically checking, by a high availability proxy, a network connection with the edge computer system; and
restoring a seamless network connection by performing failover through a new connection with an additional edge computer system using service exposure when the network connection with the edge computer system is disconnected; and
providing cooperation capability which manages task offloading of the application in the distributed cloud system,
wherein the task offloading includes migration of the application, and
wherein the application is migrated to an infrastructure near a physical location from the edge computing customer device based on an edge computing interface of the infrastructure and the new connection in the distributed cloud system.

2. The data-processing method of claim 1, wherein the task offloading includes storing a current state of the application as a snapshot image.

3. The data-processing method of claim 2, wherein restoring the seamless network connection comprises restoring the snapshot image when the snapshot image is migrated.

4. The data-processing method of claim 1, wherein the cooperation capability is enabled by an edge computing partner (ECN).

5. The data-processing method of claim 1, wherein the high availability proxy records at least one of a service port thereof, or an address thereof, or a combination of the service port and the address in the additional edge computer system for the restored network connection.

6. The data-processing method of claim 1, wherein, when the network connection with the edge computer system is disconnected, the high availability proxy automatically accesses the additional edge computer system, which is announced in advance.

7. A distributed cloud system, comprising:
storage;
a processor; and
a network system connected with a computer system,
wherein the processor
executes an application of an edge computer system, which is request by an edge computing customer device,
makes a high availability proxy periodically check a network connection with the edge computer system,
restores a seamless network connection by performing failover through a new connection with an additional edge computer system using service exposure when the network connection with the edge computer system is disconnected; and
provides cooperation capability which manages task offloading of the application in the distributed cloud system,
wherein the task offloading includes migration of the application, and
wherein the application is migrated to an infrastructure near a physical location from the edge computing customer device based on an edge computing interface of the infrastructure and the new connection in the distributed cloud system.

8. The distributed cloud system of claim 7, wherein the cooperation capability is enabled by an edge computing partner (ECN).

9. The distributed cloud system of claim 7, wherein the task offloading further includes storing a current state of the application as a snapshot image.

10. The distributed cloud system of claim 7, wherein, when a snapshot image is migrated, the processor restores the snapshot image.

11. The distributed cloud system of claim 7, wherein the high availability proxy records at least one of a service port thereof, or an address thereof, or a combination of the service port and the address in the additional edge computer system for the restored network connection.

12. The distributed cloud system of claim 7, wherein, when the network connection with the edge computer system is disconnected, the high availability proxy automatically accesses the additional edge computer system, which is announced in advance.

13. A non-transitory computer-readable storage medium for storing a program,
wherein the program:
executes an application of an edge computer system, which is requested by a user device,
makes a high availability proxy periodically check a network connection with the edge computer system,
restores a seamless network connection by performing failover through a new connection with an additional edge computer system using service exposure when the network connection with the edge computer system is disconnected, and
provides cooperation capability which manages task offloading of the application in a distributed cloud system,
wherein the task offloading includes migration of the application, and
wherein the application is migrated to an infrastructure near a physical location from an edge computing customer device based on an edge computing interface of the infrastructure and the new connection in the distributed cloud system.

* * * * *